(12) United States Patent
Iwasaki

(10) Patent No.: US 7,019,447 B2
(45) Date of Patent: Mar. 28, 2006

(54) OPTICAL-PATH CHANGING APPARATUS, AND LIGHT RADIATING APPARATUS

(75) Inventor: Tatsuya Iwasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 10/378,596

(22) Filed: Mar. 5, 2003

(65) Prior Publication Data

US 2003/0184664 A1   Oct. 2, 2003

(30) Foreign Application Priority Data

Mar. 26, 2002   (JP)   ............................. 2002-085134
Jun. 17, 2002   (JP)   ............................. 2002-175146

(51) Int. Cl.
*H01J 5/16*   (2006.01)
*F21V 5/00*   (2006.01)

(52) U.S. Cl. ...................................... 313/113; 362/551

(58) Field of Classification Search ................ 313/113; 362/31, 26, 551, 558, 582, 277, 282, 284, 362/319, 322, 323, 351

See application file for complete search history.

(56) References Cited

U.S. PATENT DOCUMENTS 6,406,158 B1 *   6/2002   Ohkawa ...................... 362/31

FOREIGN PATENT DOCUMENTS

JP   2000-111827   4/2000

* cited by examiner

*Primary Examiner*—Joseph Williams
(74) *Attorney, Agent, or Firm*—Fitzpatrick, Cella, Harper & Scinto

(57) ABSTRACT

Disclosed are an optical-path changing apparatus and a light radiating apparatus. The optical-path changing apparatus includes a light scattering member such as a light reflecting member, and a guide member for guiding the light scattering member. The direction of light scattered by the light scattering member is substantially constant during movement of the light scattering member guided by the guide member. The light radiating apparatus includes a fluorescent member, a guide member for guiding the fluorescent member, and a light emitting device for irradiating with light the fluorescent member moving along the guide member.

12 Claims, 16 Drawing Sheets

VISUAL POINT

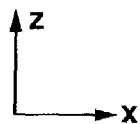
FIG.4A
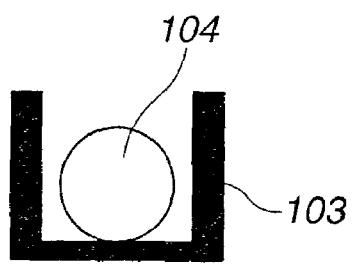
FIG.4B
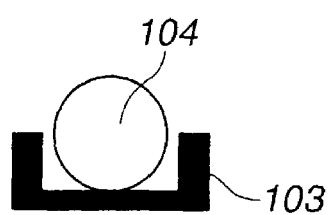
FIG.4C
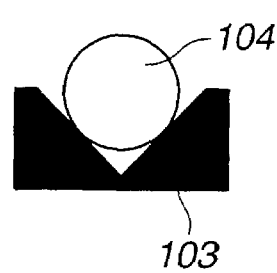
FIG.4D
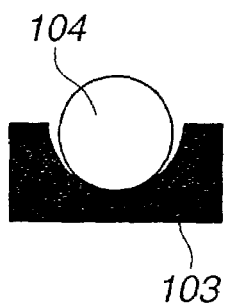
FIG.4E
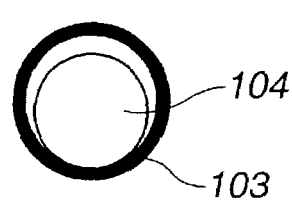

OPTICAL-PATH CHANGING APPARATUS, AND LIGHT RADIATING APPARATUS

BACKGROUND OF THE INVENTION

1. Field of the Invention

The present invention relates to an optical-path changing apparatus using a light scattering member, apparatuses using the optical-path changing apparatus, a light radiating apparatus using a fluorescent member, and apparatuses using the light radiating apparatus.

2. Description of the Related Background Art

As a display apparatus in which an LED (light emitting diode) is arranged for each row of pixels, Japanese Patent Application Laid-Open No. 2000-111827 discloses a heat mount display as illustrated in FIG. 1. In FIG. 1, there are shown an LED array 1, a lens 2, a reflective mirror 3, a mirror-supporting axis 4A, an axis holder 5A, a motor 6, gears 7, a belt 8A, an axis 9, a position detecting sensor 10, pulleys 11A and 12A, a housing 20, a guide surface 21 for controlling an angle of the mirror 3, and a guide surface 22 for supporting the mirror 3. This display apparatus has a complicated mechanism for moving the mirror 3 which reflects a light beam from the LED 1 for display, so this is not a practical apparatus.

SUMMARY OF THE INVENTION

It is an object of the present invention to provide an optical-path changing apparatus using a light scattering member and having a relatively simple structure, a light radiating apparatus using a fluorescent member and having a relatively simple structure, and apparatuses, such as a display apparatus, a light source apparatus, an image pickup apparatus, and a reading apparatus, using the optical-path changing apparatus and/or the light radiating apparatus.

According to one aspect of the present invention, there is provided an optical-path changing apparatus which includes a light scattering member such as a light reflecting member, and a guide member for guiding the light scattering member, and in which a direction of light scattered by the light scattering member is substantially constant during movement of the light scattering member guided by the guide member. In this optical-path changing apparatus, a plurality of the light scattering members can be provided, and each light scattering member can be guided by each corresponding guide member.

The following more specific constructions are possible in the above-discussed optical-path changing apparatus.

The optical-path changing apparatus can include a light scattering member with a simple shape, a guide member for guiding the light scattering member, and a driving unit for moving the light scattering member along an extension direction of the guide member, and the light scattering member and the guide member can be constructed so that light incident on the light scattering member at every location in the guide member can be scattered by the light scattering member with an approximately predetermined angular relationship relative to the extension direction. The plural guide members can be formed to extend parallel to each other. The optical-path changing apparatus can be constructed such that light incident on or scattered by the light scattering member can travel or propagate along the extension direction of the guide member. In the case of light with a high directivity such as light from a laser diode (LD), light can travel almost without being reflected by a surrounding surface of the guide member. In the case of light such as light from an LED, light can propagate with occurrence of reflection by the surrounding surface of the guide member.

Further, the optical-path changing apparatus can be constructed such that light scattered by the light scattering member can travel approximately perpendicular to the extension direction of the guide member. The optical-path changing apparatus can be constructed such that plural light scattering members can move along respective guide members with a predetermined relative positional relationship.

Further, the optical-path changing apparatus can include a light scattering member, a guide member for guiding the light scattering member, and a driving unit for moving the light scattering member along an extension direction of the guide member between a scattering position and a retracted position at which the light scattering member cannot scatter incident light. In this structure, plural light scattering members can be provided, guide members can be provided for the respective light scattering members, and each of these guide members can be arranged in a direction non-parallel (for example, perpendicular) to a propagation direction of incident light. These guide members can be arranged in a two-dimensional matrix form.

In addition, the light scattering member can be moved along the extension direction of the guide member maintaining its approximately constant posture relative to the extension direction. Freedom of movement of the light scattering member can be limited in a one-directional direction by the guide member. The light scattering member can be moved in transparent medium, such as air, in the guide member. The movement of the light scattering member can be controlled by the flow of transparent fluid in the guide member. The light scattering member can include magnetic material such that its movement can be controlled by a magnetic field acting on the light scattering member. The refractive index of the transparent medium can be made larger than that of the guide member to establish an effective waveguide for light. The guide member can be made bendable and flexible. The guide member and the transparent medium can be made of materials transparent to visible light.

According to another aspect of the present invention, there is provided a display apparatus which includes an optical-path changing apparatus including a light scattering member, and a guide member for guiding the light scattering member; and a light emitting device, such as a laser diode, for irradiating the light scattering member with light, and in which a direction of light scattered by the light scattering member is substantially constant during movement of the light scattering member guided by the guide member.

The following more specific constructions are possible in the above-discussed display apparatus.

The display apparatus can include the above-discussed optical-path changing apparatus, and a light emitting device, and can be constructed such that an image can be formed by scattered light. The display apparatus can further include a modulation unit for modulating the amount of light emitted by the light emitting device, and a detection unit for detecting the position of the light scattering member in the guide member, and the modulation unit can be controlled based on the detected position and image information signals such that an image can be formed by the scattered light.

Alternately, the display apparatus can further include a modulation unit for modulating the amount of light emitted by the light emitting device, and the modulation unit can be controlled based on a known position of the light scattering member in the guide member and image information signals such that an image can be formed by the scattered light.

Also in the display apparatus, the guide member can be made bendable and flexible to make its display portion flexible. The guide member and the transparent medium can be made of materials transparent to visible light so as to construct a see-through display whose display area is transparent to external light. The display apparatus can be constructed as a three-dimensional display apparatus that includes two-dimensionally arranged light emitting devices, plural light scattering members for changing propagation directions of light emitted from the light emitting devices, respectively, a modulation unit for modulating amounts of light beams to be emitted by the light emitting devices, and a driving unit for driving the light scattering members perpendicular (not parallel) to the two-dimensional arrangement plane of the light emitting devices.

Further, the display apparatus can include a control unit which has plural light emitting devices and a modulation unit for modulating these light emitting devices, a light guide assembly for transmitting light from the light emitting devices, and a display unit for creating a visual picture by using light beams transmitted from the control unit through the light guide assembly. The display unit can include transparent medium for transmitting those light beams along an in-plane direction of the display area, and plural light scattering members for changing paths of those light beams, respectively. The control unit and the display unit can be constructed so as to be detachably connected to the light guide assembly, respectively.

According to another aspect of the present invention, there is provided a light source apparatus which includes an optical-path changing apparatus including a light scattering member, and a guide member for guiding the light scattering member; and a light emitting device for irradiating the light scattering member with light, and in which a direction of light scattered by the light scattering member is substantially constant during movement of the light scattering member guided by the guide member. More specifically, the light source apparatus can include the above-discussed optical-path changing apparatus, and a light emitting device, and can be constructed such that an object can be illuminated with the scattered light. The light source apparatus can have a structure similar to but simpler than that of the above-discussed display apparatus, since image forming is unnecessary in the light source apparatus.

According to another aspect of the present invention, there is provided an image pickup apparatus which includes an optical-path changing apparatus including a light scattering member, and a guide member for guiding the light scattering member; and a light receiving device for receiving light impinging on and scattered by the light scattering member, and in which a direction of light scattered by the light scattering member is substantially constant during movement of the light scattering member guided by the guide member.

More specifically, the image pickup apparatus can include the above-discussed optical-path changing apparatus, and a light receiving device, and can be constructed such that the light scattering member can scatter external light and guide it into the guide member to be received by the light receiving device, and such that image pickup can be performed based on optical information received by the light receiving device and position information of the scattering member in the guide member. The light receiving device can be disposed at an end portion of the guide member. That is, the image pickup apparatus uses the optical-path changing apparatus as means for changing an optical path in a reverse direction as compared to the display apparatus. The image pickup apparatus can have a structure similar to that of the display apparatus.

According to still another aspect of the present invention, there is provided a reading apparatus which includes an optical-path changing apparatus including a light scattering member, and a guide member for guiding the light scattering member; and at least one of a light emitting device for irradiating the light scattering member with light and a light receiving device for receiving light scattered by the light scattering member, and in which a direction of light scatted by the light scattering member is substantially constant during movement of the light scattering member guided by the guide member.

In the above reading apparatus, the following more specific constructions are possible. The reading apparatus can include the above-discussed light source apparatus, and a light receiving device, and can be constructed such that light from an object illuminated with light emitted from the light emitting device and scattered by the light scattering member can be received by the light receiving device disposed at an appropriate place, and such that information on the illuminated object can be read based on optical information coming from each part of the object and received by the light receiving device. The reading apparatus can include a light source, and the above-discussed image pickup apparatus for receiving light from an object illuminated with light from the light source, and can be constructed such that information on the illuminated object can be read based on optical information coming from each part of the object and received by the light receiving device.

Further, the reading apparatus can include the above-discussed light source apparatus, and the above-discussed image pickup apparatus for receiving light from an object illuminated with light from the light source apparatus, and can be constructed such that information on the illuminated object can be read based on optical information coming from each part of the object and received by the light receiving device. The reading apparatus can also include the above-discussed light source apparatus, and a light receiving device for receiving light which is created when light from an object illuminated with light from the light source apparatus is again scattered by the light scattering member, and can be constructed such that information on the illuminated object can be read based on optical information coming from each part of the object and received by the light receiving device.

In addition, the reading apparatus can include a light emitting device, and the above-discussed image pickup apparatus for receiving light from an object illuminated with light emitted from the light emitting device and scattered by the light scattering member in the image pickup apparatus, and can be constructed such that information on the illuminated object can be read based on optical information coming from each part of the object and received by the light receiving device. The reading apparatus can also have a structure similar to that of the light source apparatus or the image pickup apparatus.

According to still another aspect of the present invention, there is provided a light radiating apparatus which includes a fluorescent member, a guide member for guiding the fluorescent member, and a light emitting device for irradiating with light the fluorescent member moving along the guide member. In this light radiating apparatus, the fluorescent member is excited by incident light and radiates light.

Therefore, wavelength or color of the incident light can be made different from that of the light from the fluorescent member. This feature is in contrast to that of the above-discussed optical-path changing apparatus in which wavelength or color of light incident on the light scattering member is the same as that of the scattered light. The light emitting device can irradiate the fluorescent member with light from a substantially constant direction during movement of the fluorescent member guided by the guide member. Further, plural fluorescent members can be provided, and they can be guided by plural guide members, respectively.

Using the above light radiating apparatus, a display apparatus and a light source apparatus can be constructed in a manner similar to that of the above-discussed optical-path changing apparatus. Also in the light radiating apparatus, the display apparatus and the light source apparatus, the above-discussed more specific constructions are basically possible.

Further, the fluorescent member and the light scattering member can be used in a mixed way in a single apparatus. For example, the following display apparatus can be constructed using the fluorescent member, the light scattering member, and blue light. In this display apparatus, each blue pixel utilizes blue light scattered by the light scattering member, such as a mirror, while green and red pixels utilize green and red fluorescent light that is radiated from green and read fluorescent members excited by the blue light, respectively.

In the above light radiating apparatus and apparatuses including the light radiating apparatus, the fluorescent member can emit light at a wavelength or a color different from that of incident light. Therefore, even when plural light emitting devices of a single type are used, color display using various colors can be achieved by using different kinds of fluorescent members, for example, In this case, a driving circuit for the light emitting devices can be simplified since only the light emitting devices of a single type are employed, and color setting by the light source is unnecessary since color designing can be executed by selecting the fluorescent member. A range of the color designing can be widened because a vastly large number of kinds of fluorescent substances are available, while the number of kinds of light sources such as laser and LED is not so large. Further, when fluorescence with a relatively wide wavelength band or spectrum is used for display, good visibility can be obtained.

In the above-discussed optical-path changing mechanism of the present invention, an appropriately-shaped light scattering member is moved by the guide member in a simple manner, and light whose optical path is changed is scanned. Also in apparatuses using the optical-path changing mechanism, such an optical-path changing function is employed.

Operation of the present invention will be described in detail using an example of a display apparatus of the present invention. For example, in the display apparatus, light beams from plural light emitting devices are transmitted in an array, and these light beams are scattered toward a direction of an observer (display direction) by light scattering members arranged corresponding to the respective light beams. Further, light scattering members are speedily moved in a direction non-parallel to the array direction of the light beams, and the respective light emitting devices are modulated to display a visual picture. When the observer watches light scattered by the speedily-moving light scattering members, the observer can recognize a two-dimensional image under the influence of afterimage.

In the display device of the present invention, the number of light emitting devices used is equal to the row or column number of pixels on the screen, and hence is smaller than that of conventional display apparatuses, such as an LED display apparatus, in which a light emitting device is arranged for each pixel. Accordingly, power consumption can be reduced, and the problem of quality deterioration of the screen due to quality variation of light emitting devices can be readily solved. Further, there is no need of matrix-like electric wiring, or of a TFT (thin-film transistor) disposed per each pixel, and the structure of a display portion can be simplified, leading to fabrication at relatively low costs.

On the other hand, the display device of the present invention uses light emitting devices whose number is larger than that of a conventional laser display in which a small number (about one to three) of light emitting devices or lasers are scanned two-dimensionally, so the display apparatus can display a sufficiently bright picture. Further, the amount of light output from each light emitting device can be reduced, so burdens on the light emitting device and its driving circuit can be lightened. In addition, its scanning optical system can be flattened and made very small, and the apparatus can be readily made resistant to physical vibrations.

Also as compared with the head mount display as illustrated in FIG. 1, the display device of the present invention has advantages that its scanning optical system can be flattened and made very small, and the apparatus can be readily made resistant to vibrations. Furthermore, the display device of the present invention, when a small (or light in weight) spherical body is used as the light scattering member, it can be rapidly moved with a simple structure.

Further, in a display portion of the display device of the present invention, only a small light scattering member for changing the optical path of light is rapidly moved. Therefore, when a unit for moving the light scattering member is provided outside the display portion, no electric wiring is needed in the display portion. Such a structure is advantageous in an increase in aperture efficiency and structural simplicity, as compared with an ordinary structure in which the area of a light emitting portion in the display portion is likely to be restricted due to the area required for electric wiring and transistors.

A light source apparatus, an image pickup apparatus, and a reading apparatus using the optical-path changing mechanism of the present invention have functions and advantages similar to those of the above-discussed display apparatus. Furthermore, the above advantages basically hold true in the light radiating apparatus of the present invention and apparatuses including the light radiating apparatus.

These advantages, as well as others, will be more readily understood in connection with the following detailed description of the preferred embodiments and examples of the invention in connection with the drawings.

BRIEF DESCRIPTION OF THE DRAWINGS

FIGS. 4A to 4E are cross-sectional views illustrating examples of guide members for guiding light scattering members or fluorescent members used in apparatuses of the present invention, respectively.

DESCRIPTION OF THE PREFERRED EMBODIMENTS

Embodiments of apparatuses using an optical-path changing mechanism or a light radiating mechanism of the present invention will be described by reference to the drawings.

Figure 1:
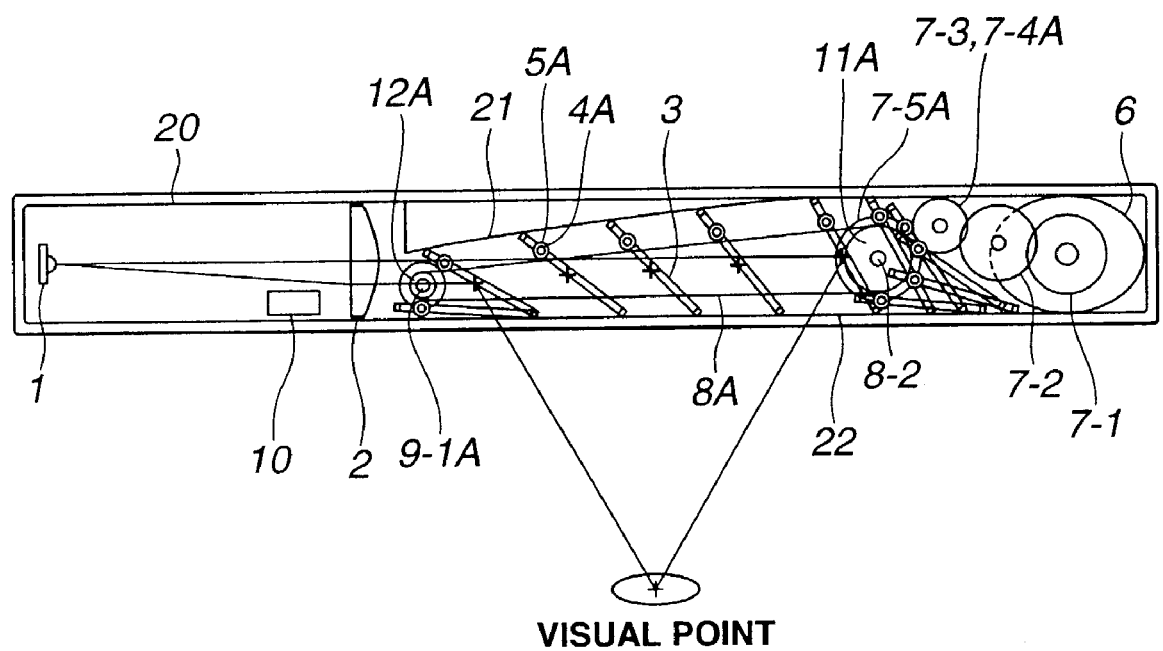
FIG. 1 is a cross-sectional view illustrating a conventional display apparatus.
Figure 2:
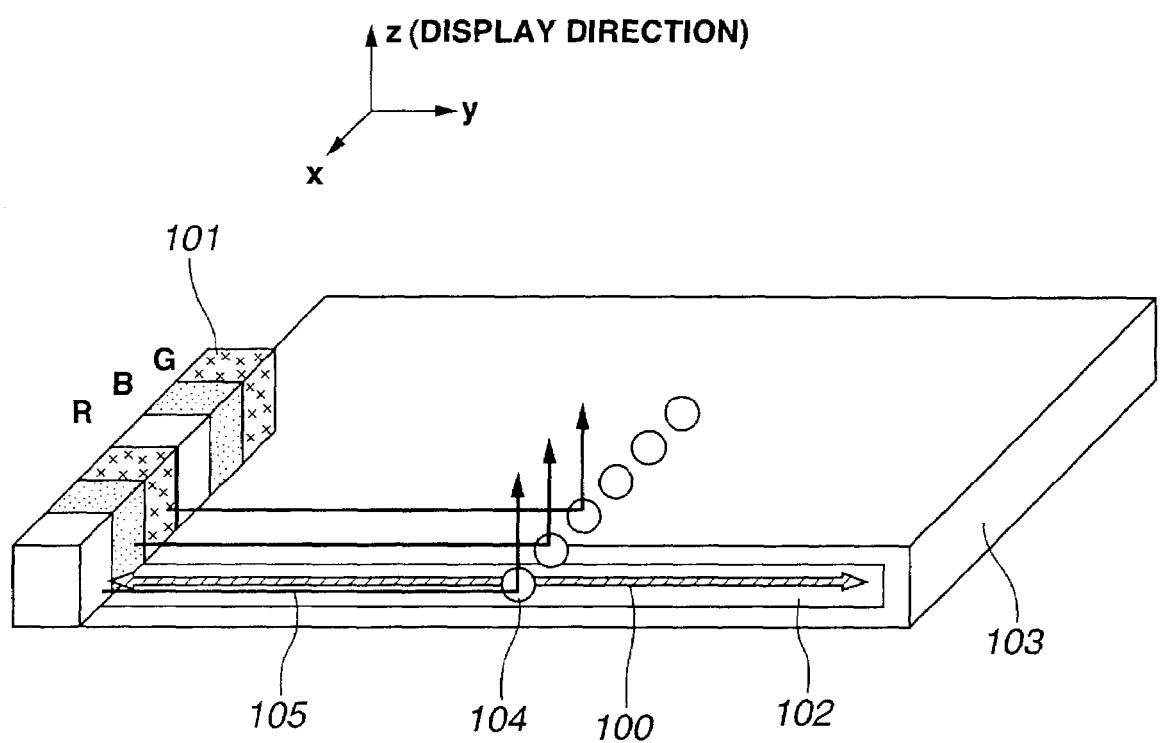
FIG. 2 is a schematic perspective view illustrating the structure of embodiments of a display apparatus according to the present invention.

FIG. 2 is a schematic perspective view illustrating a first embodiment of a display apparatus including an optical-path changing mechanism of the present invention. In FIG. 2, there are shown light emitting devices 101, transparent medium 102, a guide member or support guide 103, light scattering members 104 and light beams 105 emitted from the respective light emitting devices 101. Plural light emitting devices 101 are arranged corresponding to respective pixel rows or columns of a screen or display area constructed by an upper surface of the guide member 103. For example, the light emitting devices 101 are disposed in a row extending along the x-direction at the end portion of the screen, as illustrated in FIG. 2. With the screen of m×n pixels, m (or n) light emitting devices 101 are arranged (m and n are positive integers).

Plural light beams 105 from the light emitting devices 101 propagate in the y-direction in a parallel manner along propagation paths composed of the transparent medium 102 and the guide member 103. The beams 105 are scattered toward an observer (z-direction) by the light scattering members 104 provided corresponding to the respective beams 105.

Plural light scattering members 104 rapidly move in a direction 100 (y-direction) along the respective propagation paths defined by the guide member 103 and filled with the transparent medium 102. Each light scattering member 104 is periodically reciprocated (reverses direction) at intervals of a frame frequency, for example. Due to this reciprocal movement, each light beam 105 is scattered at various locations in a moving range of one of the light scattering members 104.

In such a structure, when the light emitting device 101 outputting the light beam 105 into the Px-th row or column is modulated in synchronization with the y-direction position Py of the light scattering member 104 moving along the Px-th row or column, the amount of light scattered at the position (Px, Py) is regulated to perform display. For example, where the y-direction position Py of each light scattering member 104 is divided into n places (pixels) and the light intensity of each light emitting device 101 is modulated in accordance with the place n of the corresponding light scattering member 104, an m×n picture can be formed. Thus, while the scattered position of each light beam 105 is rapidly scanned by the movement of each light scattering member 104, each light emitting device 101 is modulated based on image information in synchronization with the movement of the light scattering member 104. The observer can recognize a two-dimensional picture due to the effect of afterimage.

Each element of this embodiment will be described in more detail. The construction of a display panel will be described first. The light emitting device 101 can be a laser diode (LD), an LED, an organic LED, or the like. An LD with high radiation efficiency and directivity is most preferable, though it depends on the structure of the display apparatus. When light emitting devices 101 of three colors R (red), G (green) and B (blue) are used, color display can be achieved.

The light scattering member 104 is preferably what can effectively scatter the light beam 105 propagating in the y-direction toward the z-direction (display direction). From such a point of view, light scattering members 104 with a 45-degree mirror shape, a conical shape, a spherical shape, an oval shape, a truncated conical shape, and the like are usable. Especially, the spherical light scattering member 104 can be preferably used since it can be readily moved at high speed and it has a sufficient scattering efficiency. It is advantageous also in its high productivity, and in that its profile has no directivity and can hence be readily set in the guide member 103.

Figure 3A:
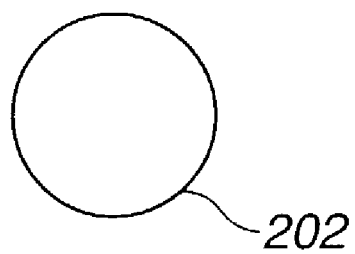
FIGS. 3A to 3D are cross-sectional views illustrating examples of light scattering members or fluorescent members used in apparatuses of the present invention, respectively.
Figure 3B:
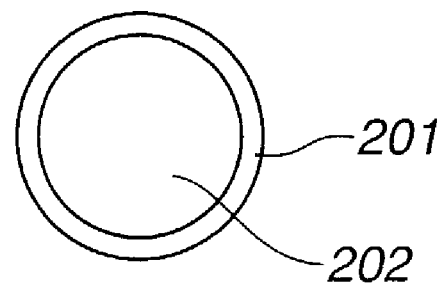
Figure 3C:
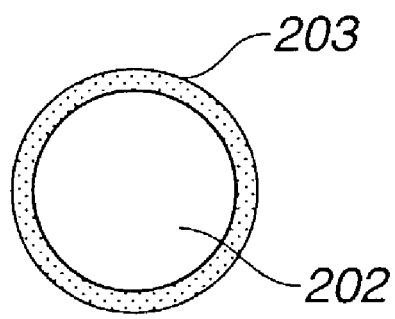
Figure 3D:
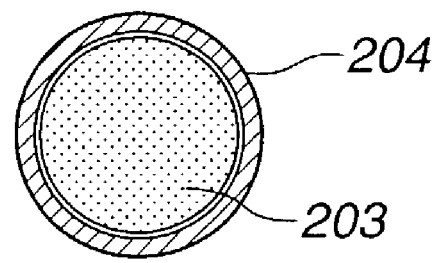

As the spherical light scattering member, there exists a metal ball 202 as illustrated in FIG. 3A, a metal-coated ball formed by coating a resin or glass ball 202 with a metal 201 as illustrated in FIG. 3B, and a coated ball formed by coating a resin or glass ball 202 with an appropriate material 203 capable of effectively scattering light, such as white ink, as illustrate in FIG. 3C. Among these, the metal ball 202 is suitable for mass production. The balls as illustrated in FIGS. 3B and 3C are light in weight, so they can be readily moved speedily. Further, a light scattering capsule as illustrated in FIG. 3D can be used. This capsule can be formed by sealing a material 203 excellent in light scattering capability, such as white ink, into a capsule 204 of transparent resin. Metal-coating, white-ink coating, and capsuling can also be applied to light scattering members 104 with shapes other than the sphere.

When the light scattering member 104 is to be moved by a magnetic force, a magnetic member such as a steel ball can be used as the light scattering member 104. Alternatively, magnetic materials, such as neodymium magnet, samarium magnet, Alnico (name of product) magnet, or ferrite, can be used. A light scattering member formed by coating a glass or resin ball with magnetic material such as nickel (Ni) can also be used. Furthermore, the light scattering member 104 can be subjected to appropriate surface coating such that flaws on its surface and its friction within the guide member 103 can be reduced.

The guide member 103 restricts the moving direction of the light scattering member 104. Thus, the movement of the light scattering member 104 can be precisely controlled. As the guide member 103, a transparent glass or resin material can be used. Specifically, where the guide member 103 is composed of a bendable and flexible resin sheet or tube, a flexible display apparatus with a flexible display portion can be obtained.

In the structure of FIG. 2, each light scattering member 104 can be moved only in the y-direction along each path defined by the guide member 103. As a guide path of the guide member 103, there exists a square groove as illustrated in FIGS. 4A and 4B, a V-shaped groove as illustrated in FIG. 4C, a round groove as illustrated in FIG. 4D, and a circular tube as illustrated in FIG. 4E. A capillary member or the like can be used as the tube, and this is suitably usable with the spherical light scattering member discussed above. A stopper or a reaction-absorbing member for preferably stopping the light scattering member 104, or spring material for bouncing the light scattering member 104 can be disposed at ends of the guide member 103.

The main function of the guide member 103 is to guide the movement of the light scattering member 104, so the surface of the guide member 103 is preferably smooth enough to appropriately control the movement of the light scattering member 104. Further, the guide member 103 can serve as a guide for guiding propagation of the light beam 105. In other words, the transparent medium 102 and the guide member 103 can constitute an optical waveguide. For this purpose, the surface of the guide member 103 is preferably made so smooth that scattering of light at the interface between the guide member and the transparent medium can be suppressed.

In addition, a difference between refractive indices of the guide member 103 and the transparent medium 102 is preferably small to suppress scattering at the interface. This structure can also suppress reflection of external light, and contribute to a display apparatus with excellent visibility of a displayed picture. More particularly, in the case of see-through display, transparency can be preferably enhanced by the above structure.

As the transparent medium 102, vacuum or air, dried air, inert gas, silicone oil, water, glycerin, or the like can be used. In cases of vacuum or air, gas, and the like having a small refractive index, it is preferable to form the guide member 103 with a material also having a small refractive index. The guide member 103 can be formed of fluorine-contained resin, for example. When transparent material such as silicone oil is used as the transparent medium 102, a display apparatus with excellent visibility can be achieved by forming the guide member 103 with a material having a refractive index close to that of this transparent material.

When the refractive index of the guide member 103 is set slightly smaller than that of the transparent medium 102, an optical waveguide with a core of the transparent medium and a cladding layer of the guide member can be constructed. Light from the light emitting device 101 can be effectively transmitted thereby along the transparent medium 102, and effectively guided to the light scattering member 104. In the event that shielding between the light beams 105 is insufficient and there is fear of degradation of a displayed picture due to optical intermingling between the light beams 105, a black stripe or the like can be interposed between light propagation paths of the guide member 103.

The above elements are constituent parts of a display apparatus, and they can be appropriately arranged on a substrate, or in an external housing.

The movement of the light scattering member 104 will be described. The light scattering member 104 is moved in a direction non-parallel to an array direction of the light beams 105. In the structure of FIG. 2, when the light scattering member 104 is reciprocated at periods of 10 Hz, a picture can be displayed at frame frequencies of 20 Hz. It is preferable to move the light scattering member 104 at as constant a speed as possible. When position and speed of the light scattering member 104 are controlled, a desired picture can be formed by modulating the light emitting device 101 according to the controlled position and speed even if the speed of the light scattering member 104 changes.

As driving means for the light scattering member 104, any desired actuator can be used. For example, there exist a method of moving the light scattering member 104 by means of a flow of gas, fluid or the like, a method of moving the light scattering member 104 of a magnetic material by means of magnetic force, a method of moving the light scattering member 104 in a squirm motion manner using an ultrasonic-wave motor arranged along the guide member 103, and a method of moving the light scattering member 104 in a squirm motion manner using a piezoelectric element arranged along the guide member 103.

Figure 5A:
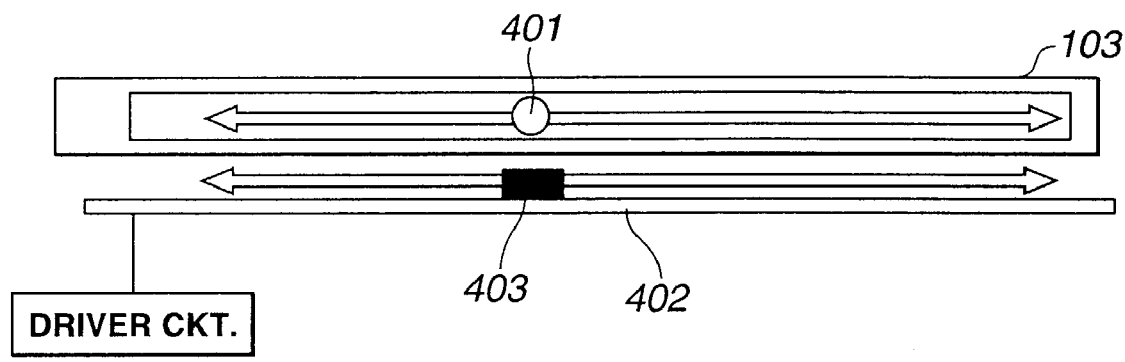
FIGS. 5A to 5C are views illustrating methods of moving the light scattering member or fluorescent member using magnetic force.

FIG. 5A illustrates an example in which a light scattering magnetic member 401 is moved by a magnet 403 arranged on a back side of the display portion. The magnet 403 is disposed on a linear motor 402, and desirably moved by controlling a driver of the linear motor 402. The light scattering member 401 is moved according to movement of the magnet 403 by a magnetic force generated thereby.

Figure 5B:
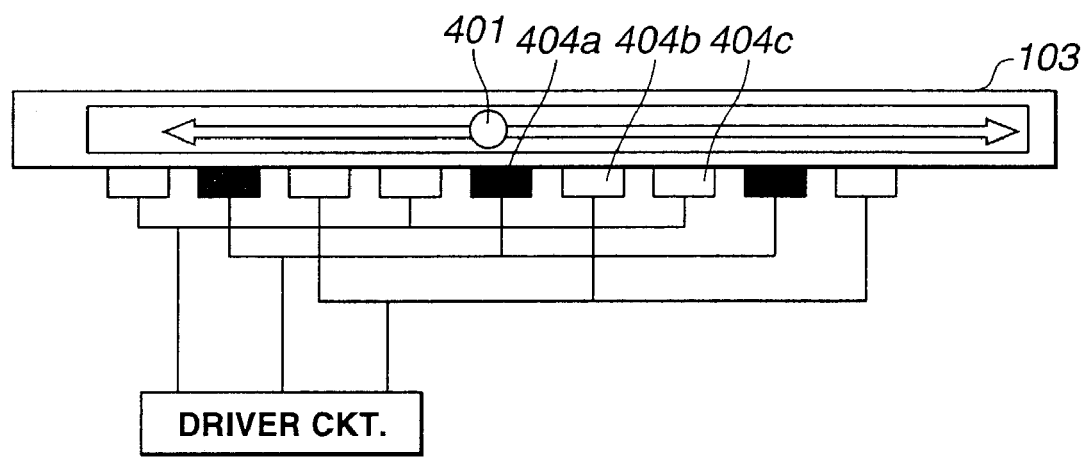
Figure 5C:
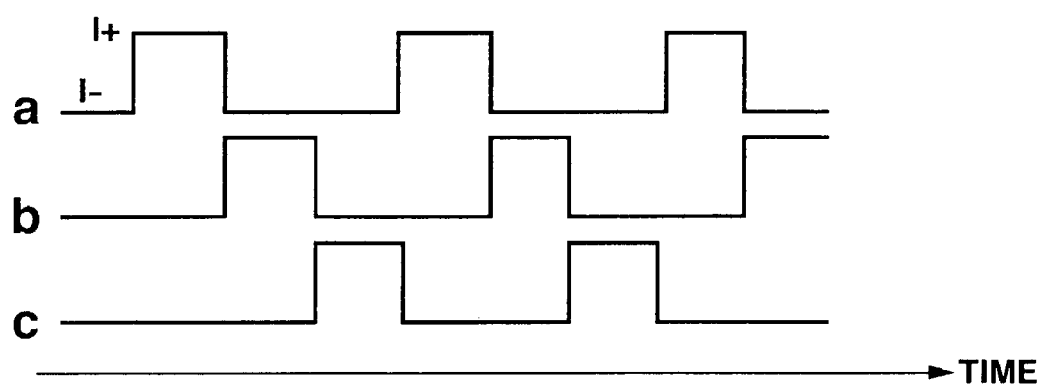

FIG. 5B illustrates an example in which plural electrodes (coils) 404 for generating magnetic force are arranged on a back side of the display portion, and current is injected into the electrodes 404a, 404b and 404c with an appropriate timing as illustrated in FIG. 5C (letters a, b and c therein indicate currents injected into the electrodes 404a, 404b and 404c, respectively) such that a magnetic force generated by the currents is scanned to move the light scattering magnetic member 401.

Figure 6A:
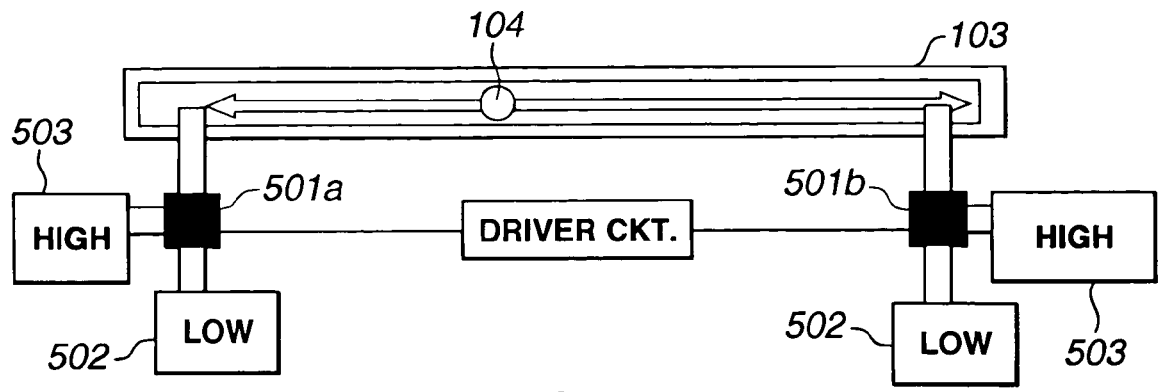
FIGS. 6A to 6D are views illustrating methods of moving the light scattering member or fluorescent member using a fluid flow.
Figure 6B:
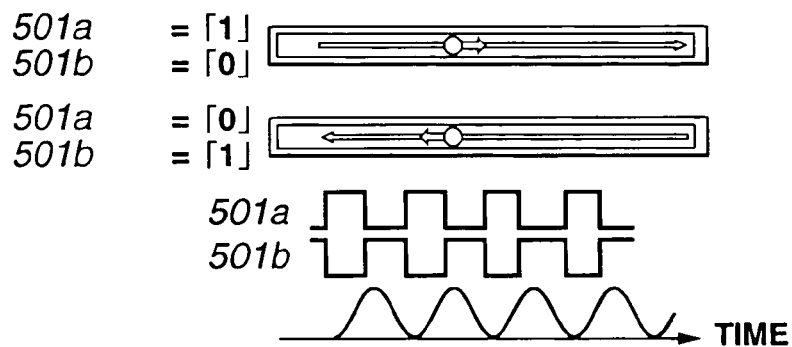

FIG. 6A illustrates an example in which the light scattering member 104 is moved by flow of transparent medium. The flow of liquid or gas is controlled by high-speed electromagnetic valves 501a and 501b disposed at either end of the guide member 103 so as to reciprocate the light scattering member 104. High pressure portion 503 and low pressure portion 502 are connected to each of the electromagnetic valves 501a and 501b, and their connection to each electromagnetic valve is appropriately changed as illustrated in FIG. 6B to reciprocate the light scattering member 104. As illustrated in FIG. 6B, when the electromagnetic valve 501a is connected to the high pressure portion 503 (indicated by [1]) and the electromagnetic valve 501b is connected to the low pressure portion 502 (indicated by [0]), the light scattering member 104 moves rightward. In contrast, when the electromagnetic valve 501a is connected to the low pressure portion 502 (indicated by [0]) and the electromagnetic valve 501b is connected to the high pressure portion 503 (indicated by [1]), the light scattering member 104 moves leftward.

Figure 6C:
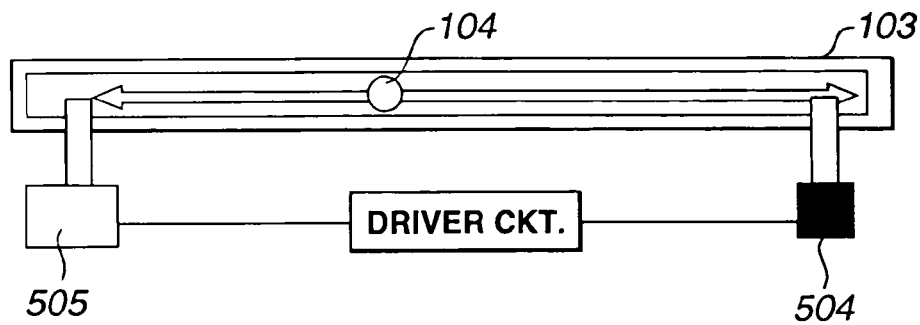
Figure 6D:
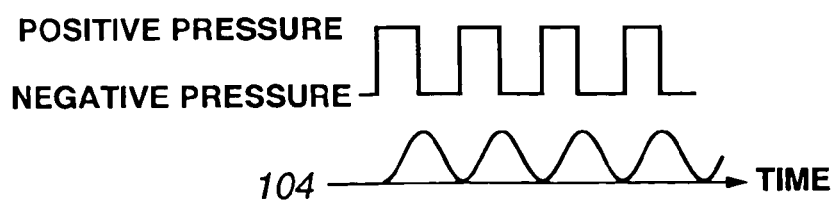

FIG. 6C illustrates another example in which pressure control portion 504 and fluid reservoir 505 are disposed at either end of the guide member 103, and positive pressure and negative pressure are repeatedly created as illustrated in FIG. 6D such that push and pull of the light scattering member 104 are repeated to reciprocate the light scattering member 104. As the pressure control portion 504, devices, such as a pump, capable of controlling the pressure in the guide member 103 can be used.

Further, the position of the light scattering member can be more accurately controlled by detecting its position and performing feedback or servocontrol. More specifically, a sensor for detecting the above position is arranged at an appropriate portion of the display apparatus, and position information is acquired from the sensor. The sensor can be disposed on an entire area of movement of the light scattering member, or at a portion of the display apparatus, such as its end portion. The sensor can be a reflection- or transmission-type photoelectric sensor capable of optical sensing.

The light emitting device in the display apparatus can be used as a light source for the sensor. For example, a portion of light emitted from the light emitting device and scattered by the light scattering member (such as light scattered toward a negative z-direction) can be monitored by a light receiving device disposed on the back side of the display portion. A non-display area can be provided at a portion of the area of movement of the light scattering member, such as its end portion, and the light receiving device can be arranged in this neighborhood to construct a monitor for monitoring the location of the light scattering member.

Figure 8A:
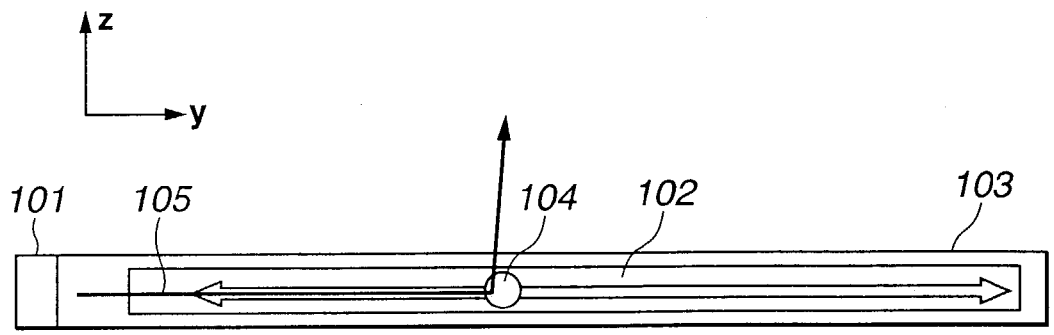
FIGS. 8A to 8D are cross-sectional views illustrating embodiments of a display apparatus of the present invention.
Figure 8B:
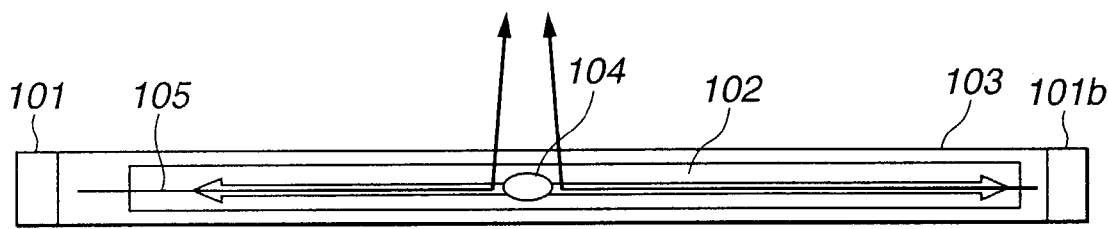

Further, as illustrated in FIG. 8B referred to later, plural light beams are guided to a single light scattering member, and a portion of scattered light can be used as a light source for the above-discussed position monitor. In the structure of FIG. 8B, light emitting devices 101 and 101b are arranged at either end of the display portion, and light beams from both ends are guided to the light scattering member 104. In such a case, the light beam from one side can be used for display, and the light beam from the other side can be used for the position monitor. Separate from the light emitting device for display, another light emitting device can be provided exclusively for detecting the location of the light scattering member. In this case, invisible light such as infrared light can be used as light for monitoring the location. Electric power consumption of longer-wavelength light sources is small and advantageous.

As described later, information of the sensed position can also be used for control of the light emitting device, as well as for control of the movement of the light scattering member.

Figure 7:
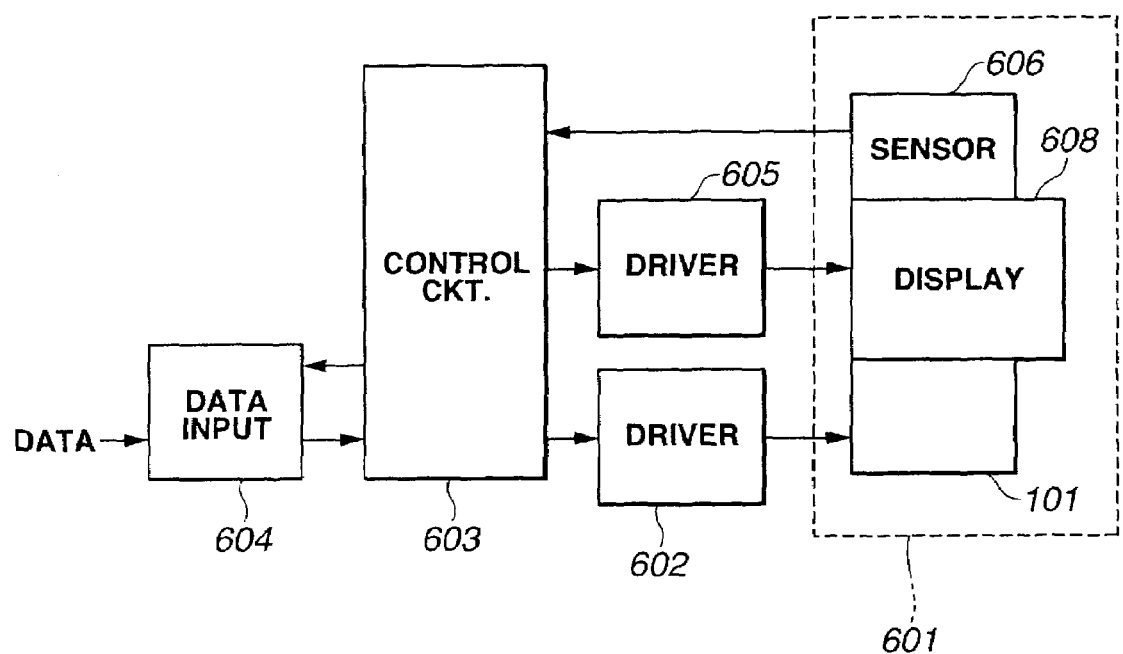
FIG. 7 is a block diagram illustrating an example of the entire structure of a display apparatus of the present invention.

An example of an electric structure of the display apparatus (an electric circuit portion) will be described referring to FIG. 7. FIG. 7 illustrates an electric circuit for performing display according to image signals such as NTSC signals and video signals. There are shown an image display panel 601, a driver circuit 602 for the light emitting device 101, a control circuit 603, an image data input portion 604, a driver circuit 605 for the light scattering member, a sensor 606 for detecting the position of the light scattering member, and a display portion 608.

From the image data input portion 604, image data such as video signals are supplied to the control circuit 603 in a desired form under control of the control circuit 603. For example, in the input portion 604, a frame memory stores the image data by each frame unit, and at the same time outputs each row or column image data of the stored frame image into a register in conformity with an address signal input from the control circuit 603. The register holds each row image data, and outputs it to the control circuit 603 under the control thereof.

The driver circuit 602 is connected to the light emitting device 101, and performs desired modulation of the light emitting device 101 under control of the control circuit 603. As a modulation method of the light emitting device 101, any one of current modulation method, voltage modulation method, pulse-width modulation method and the like can be adopted. In the case of voltage or current modulation method, an appropriate circuit is used to generate predetermined voltages or currents according to input data to modulate the output of the light emitting device 101. In the pulse-width modulation method, an appropriate circuit is used to generate a voltage pulse with a predetermined peak value and modulate the width of the voltage pulse according to the input data. Likewise, a modulation method of modulating the peak value of the pulse, or both of the voltage and pulse width, can be adopted.

The driver circuit 605 is a circuit for controlling the movement of the light scattering member. Depending on driving method for the light scattering member, the circuit 605 drives a coil in the case of an electromagnetic driving method using a linear motor or the like, or drives an electromagnetic valve for controlling fluid or a pressure controller in the case of a driving method using fluid.

The control circuit 603 has a function of matching operations of the respective portions such that an appropriate display can be executed based on the image signals. The control circuit 603 controls the respective portions such that light of each pixel row or column linearly displayed by the light emitting device 101 can be viewed as a two-dimensional picture by reflection by one of the rapidly-moving light scattering members. Further, the control circuit 603 supplies control signals to respective portions such as the driver circuits 602 and 605 based on a synchronization signal separated from the image signal or a clock signal generated in the control circuit 603.

The control circuit 603 can further control the modulation signal to the driver circuit 602 for the light emitting device based on position Py and moving velocity Vy of the light scattering member supplied from the sensor 606, as well as the image information from the image data input portion 604. It is preferable that the relationship between the position and velocity of the light scattering member 104 and the modulation for the light emitting device 101 (namely, how the modulation signal should be output based on the input image data in view of the position and velocity) be stored beforehand as table data. The control circuit 603 sets the driving condition of the light emitting device 101 and modulates it based on the table data and the image data.

For example, in the case of a uniformly-moving light scattering member, the light emitting device 101 for outputting a light beam into a Px-th row or column is modulated so as to output an amount of light corresponding to image information based on image data corresponding to a position (Px, Py) when the light scattering member is at a position Py. On the other hand, in the case of a non-uniformly-moving light scattering member, an amount of light from the light emitting device 101 needs to be increased at a position where velocity is high, in view of the fact that at a pixel portion where the velocity is high, display time (time for which the light scattering member scatters the light beam at the pixel portion) becomes short. For example, a value obtained by multiplying the pixel data corresponding to the position (Px, Py) by a weight proportional to velocity Vy is output into the driver circuit 602, thereby modulating the light emitting device 101 for outputting the light beam in the Px-th row or column.

Further, the control circuit 603 can control the driver circuits 602 and 605 based on the position signal of the light scattering member input from the position detecting sensor 606. As previously described, control of the moving light scattering member can be improved by feeding back the position signal to the driving of the light scattering member. Further, the position signal of the light scattering member can be fed back to the driving of the light emitting device 101, namely the output of the image display information. In other words, when the light scattering member is at the position Py, the light emitting device 101 for outputting a light beam into the Px-th column can be controlled so as to emit light of the image information corresponding to the position (Px, Py) with more accurate timing based on the position of the light scattering member detected by the sensor 606. Where the velocity of the light scattering member is not constant, it is possible as described previously to store the position Py and velocity Vy in the control circuit 603 as a timing table, and set the driving condition of the light emitting device 101 in view of the timing table. In other words, the control circuit 603 can appropriately formulate the form of image information in view of the signal input from the sensor 606 and the stored table data, and drive and control the light emitting device 101.

Figure 8C:
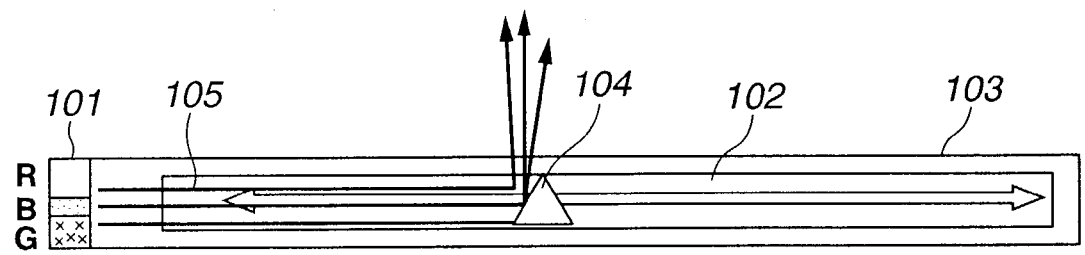

FIGS. 8A to 8C illustrate variations of the display apparatus of the first embodiment. FIG. 8A shows the z-y cross section of the display apparatus illustrated in FIG. 2. In FIG. 8A, a single light scattering member 104 is provided for a single light emitting device 101, but plural light scattering members can be provided for a single light emitting device, or a single light scattering member can be provided for plural light emitting devices. FIG. 8B illustrates the latter case. Two light emitting devices 101 and 101b illuminate a single light scattering member 104 with light beams 105 from two directions. In this structure, the light scattering member 104 at each pixel position scatters light from the two light emitting devices in the z-direction, so a brighter display apparatus can be obtained. Also, a single light scattering member can deal with information of two pixels. For example, light emitting devices of different color radiation can be disposed at both ends of the guide member 103. FIG. 8B illustrates a structure in which an oval light scattering member 104 is used.

FIG. 8C illustrates a structure in which light emitted by three light emitting devices 101 of R, G and B colors is transmitted and scattered by a single light scattering member 104. Structures like this are effective in applications of high precision display apparatuses since a single light scattering member 104 can take charge of information of plural pixels. In the structure of FIG. 8C, the shape of the light scattering member 104 is conical.

Figure 8D:
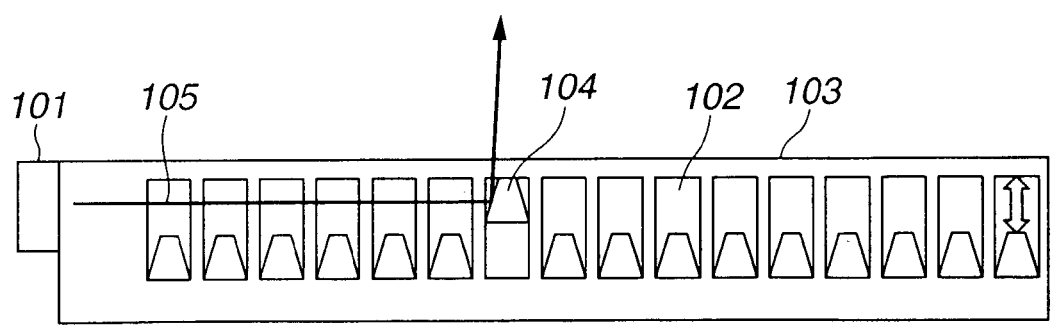

FIG. 8D illustrates a second embodiment of a display apparatus in which a light scattering member 104 is moved in a direction (z-direction) perpendicular to a display surface. In this structure, the light scattering member 104 is provided for each pixel, and moves upward and downward. The upper position is a position where the light scattering member 104 changes the optical path of a light beam 105, and the lower position is a position where the light scattering member 104 is retracted from the optical path. In the structure of FIG. 8D, an ON pixel where the light scattering member 104 takes the upper position is shifted in sequence in the y-direction such that the position y where the light beam 105 in each position x is scattered can be scanned in the y-direction. Thus, pixel information at each position (x, y) can be displayed. In FIG. 8D, a light scattering member 104 with a truncated conical shape is used, but other shapes such as a spherical shape can also be used.

Also in the structure of FIG. 8D, any actuating means as described previously can be used as driving means for the light scattering member 104. The electric circuit portion as illustrated in FIG. 7 can be basically used as that of the display apparatus of FIG. 8D with the exception that the sensor 606 can be omitted since the control circuit 603 can recognize which light scattering member 104 takes its optical-path changing position (upper position).

Figure 9:
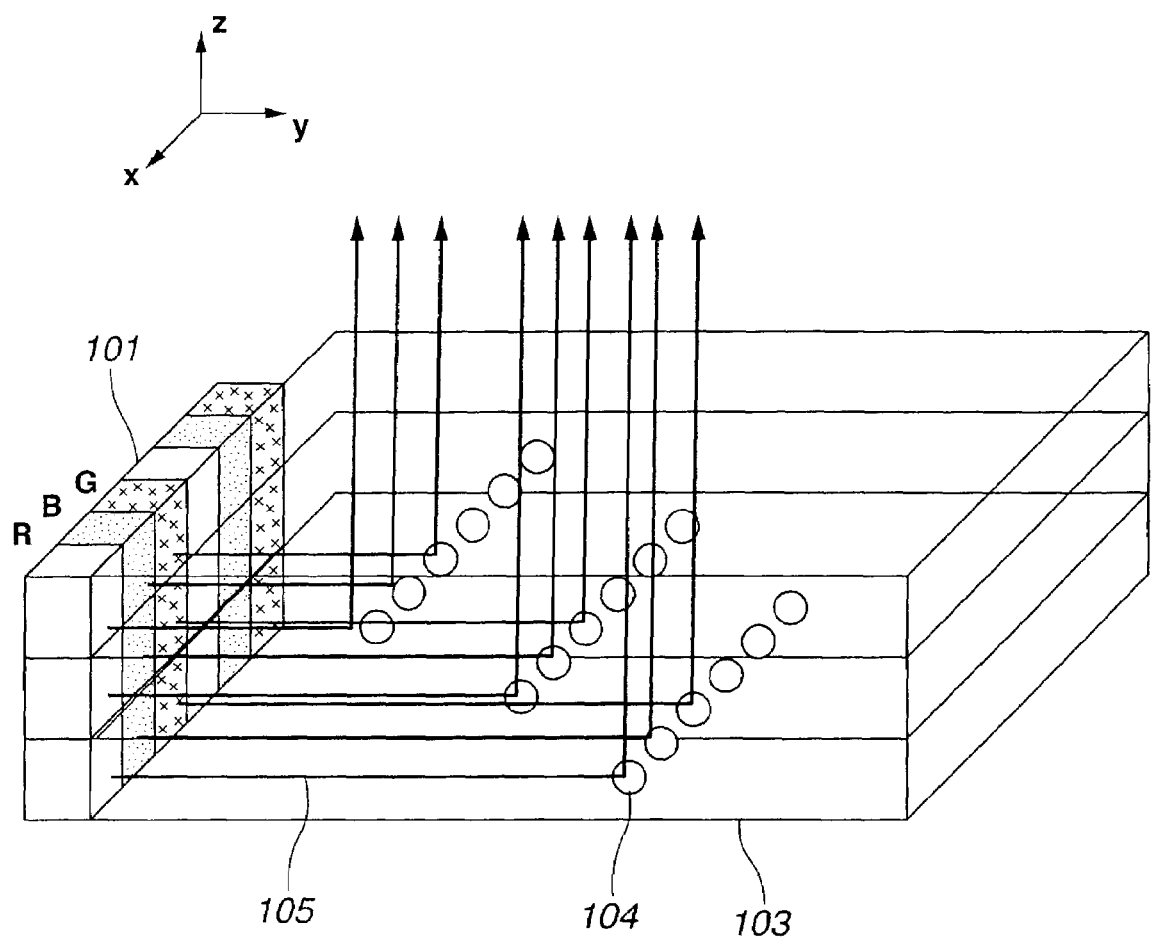
FIG. 9 is a perspective view illustrating an embodiment of a three-dimensional display apparatus of the present invention.

FIG. 9 illustrates a third embodiment of a three-dimensional display apparatus in which plural transparent display portions are stacked. In this structure, plural light emitting devices 101 of R, G and B colors are arranged two-dimensionally on the x-z surface, and light beams 105 emitted from these light emitting devices 101 in a two-dimensional arrayed form are transmitted in the y-direction to be scattered in the z-direction by respective light scattering members 104. This display apparatus can display a three-dimensional color picture based on the above-described mechanism in which the amount of light to be scattered at each position (Px, Py, Pz) by the light scattering member 104 can be appropriately controlled.

Figure 10:
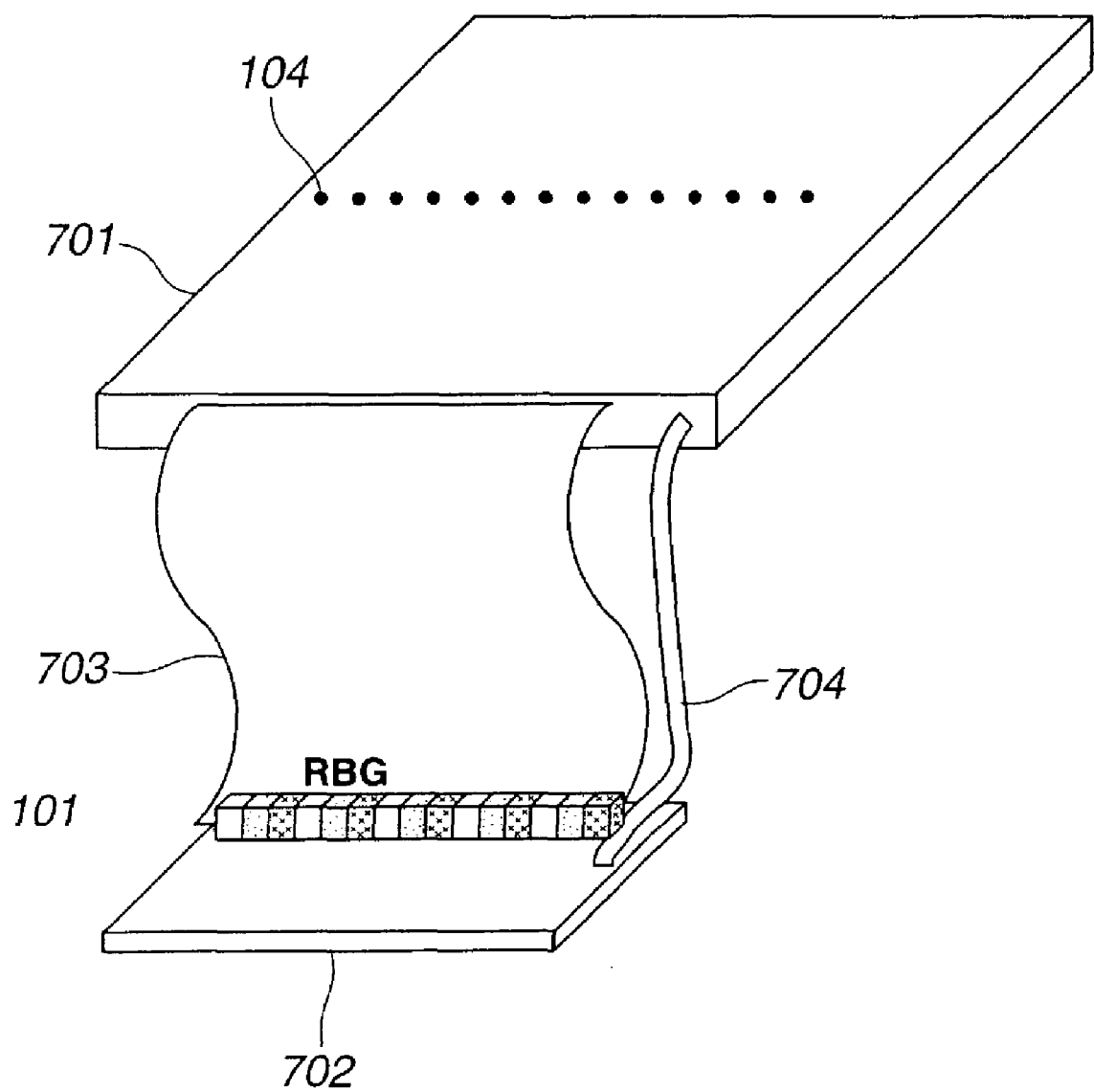
FIG. 10 is a perspective view illustrating embodiments of a display apparatus of the present invention which includes a display unit, a control unit, and a light guide assembly.

FIG. 10 illustrates a fourth embodiment of a display apparatus which includes a control unit 702 having arrayed light emitting devices 101, a driver circuit for driving the light emitting devices 101, and a driver circuit for reciprocating light scattering members 104, a display unit 701 having the light scattering members 104, and a light guide assembly 703 composed of plural light guides for guiding light beams from the light emitting devices 101 to the respective light scattering members 104 in the display unit 701. In the structure of FIG. 10, there is further provided between the control unit 702 and the display unit 701 a fluid drive line 704 for supplying to the display unit 701 fluid for driving the light scattering members 104. In such a display unit 701, only a small light scattering member 104 is speedily moved along the guide member, so no electric wiring is needed.

Further, in the display apparatus of FIG. 10, the display portion can be constructed of only transparent material and small light scattering members 104 for changing the optical path, so the display portion can be readily made transparent. Thus, a see-through display can be readily obtained. When the guide member 103 is formed of flexible and bendable material, a flexible display with a bendable display portion can be constructed.

The above-discussed display apparatus can be used as various display apparatuses such as a display instrument for television broadcasting, displays for computers, cellular phones and the like, and head mount displays.

A fifth embodiment of a light source apparatus of the present invention will be described. FIGS. 11A to 11D illustrate its variations. In FIGS. 11A to 11D, there are shown a light emitting device 101 or 101b, transparent medium 102, a guide member 103, a light scattering member 104, and a light beam 105. The structure of the light source apparatus is similar to that of the above-discussed display apparatus. Plural light beams 105 emitted from plural light emitting devices 101 in a linearly arrayed form are transmitted in the y-direction along propagation paths composed of the transparent medium 102 and the guide member 103 to be scattered toward an object (z-direction) by respective light scattering members 104 provided corresponding to the light beams 105. Thus, light from the arrayed light emitting devices 101 is scanned in the y-direction to produce a planar light source. In the light source apparatus, there is no need of modulating the light emitting device, the data input portion 604 and position sensor 606 as illustrated in FIG. 7 can be omitted, and its control circuit can be much simpler than the control circuit 603 of the display apparatus.

Figure 11A:
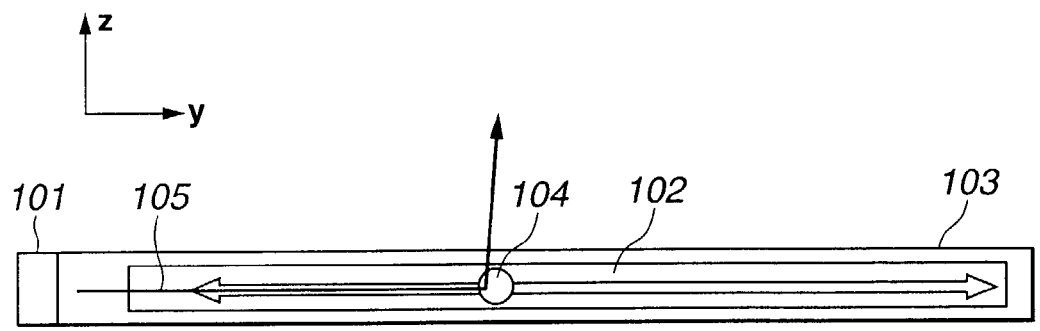
FIGS. 11A to 11D are cross-sectional views illustrating embodiments of a light source apparatus of the present invention, respectively.
Figure 11B:
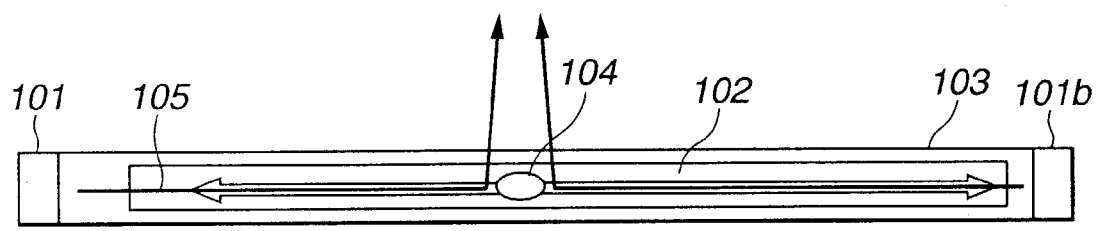
Figure 11C:
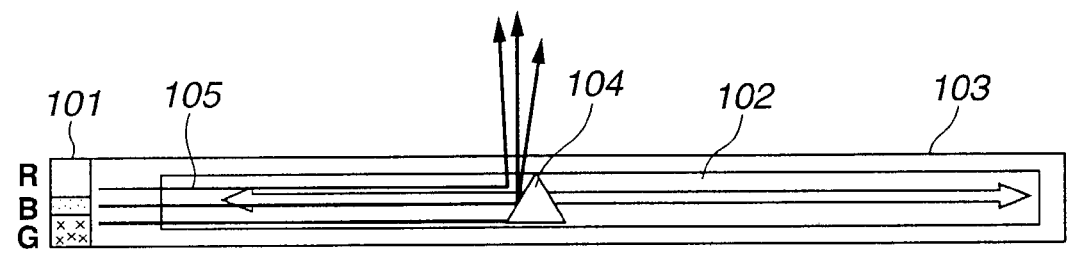
Figure 11D:
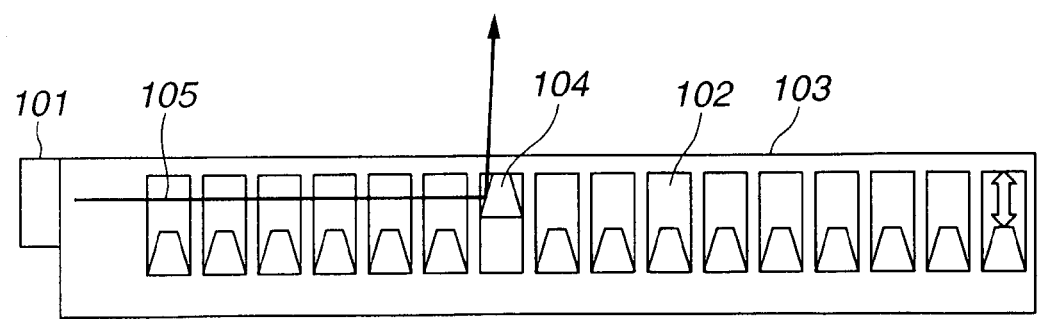

The light source apparatus illustrated in each of FIGS. 11A to 11C includes light emitting devices 101, light scattering members 104 for scattering light from the light emitting devices 101, guide member 103 for guiding the light scattering members 104, and driving means (see the driver circuit 605 in FIG. 7) for moving the light scattering members 104 along the extension direction (y-direction) of the guide member 103. The light scattering members and the guide member are constructed such that light incident on the light scattering member 104 at every location in the guide member 103 can be scattered by the light scattering member 104 with an approximately predetermined angular relationship relative to the extension direction (y-direction). Thus, the object is illuminated with light scattered by the plural light scattering members 104.

Structures of the light source apparatuses in FIGS. 11A to 11D correspond to those of the display apparatuses in FIGS. 8A to 8D, respectively. In respective light source apparatuses, the light emitting device 101 can be a white light source, or a monotone or multi-color light source using visible-color light emitting devices of R, G and B. Further, an infrared or ultraviolet light emitting device can be used. As the light emitting device 101, laser diode (LD), LED, organic LED, electrical discharge lamp, or the like can be employed. Among these, the LD is preferable since it has high radiation efficiency and high directivity.

Also in the light source apparatus, the structure as illustrated in FIG. 10 can be adopted. In this structure, light beams from the light emitting devices 101 can be guided to a light radiating unit through the light guide assembly 703.

In the above-discussed planar light source apparatus, a light radiating portion can be composed only of transparent material and small light scattering members 104 for changing the optical path, so the light radiating portion can be readily made transparent. Thus, a see-through light source apparatus can be obtained. Further, a flexible planar light source apparatus can be obtained. In addition, a highly-bright light source apparatus can be achieved by stacking plural transparent light source portions.

The above-discussed light source apparatus can be employed as various light source such as a backup light of a liquid crystal display apparatus, a light source of a facsimile copying machine, as well as a lamp or a fluorescent light.

A sixth embodiment of an image pickup apparatus of the present invention will be described. FIGS. 12A to 12D illustrate its variations. In FIGS. 12A to 12D, there are shown light receiving devices 901, 901b or 901c, transparent medium 102, a guide member 103, a light scattering member 104, and a light beam 105. The structure of the image pickup apparatus is also similar to that of the above-discussed display apparatus. The light scattering members and the guide member are constructed such that each light scattering member 104 at every position in the guide member 103 guides incident light into the guide member 103 to create a light beam 105 propagating along the guide member 103. The light receiving member 901 is arranged so as to receive the light beam 105 guided into the guide member 103, and image pickup is performed using light received by the light receiving device 901.

Figure 12A:
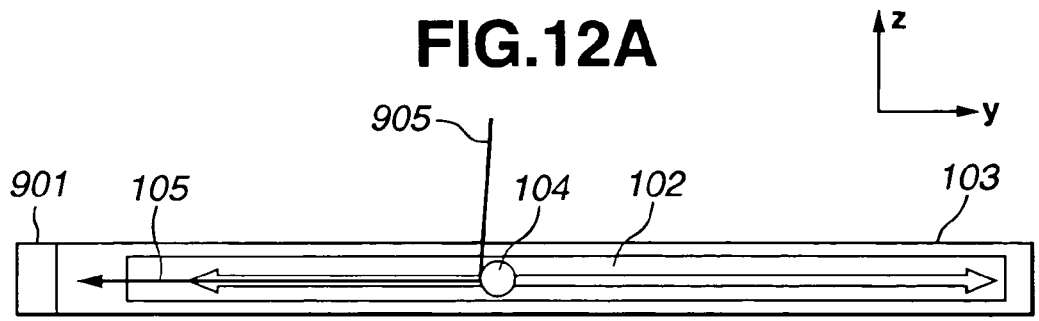
FIGS. 12A to 12D are cross-sectional views illustrating embodiments of an image pickup apparatus of the present invention, respectively.
Figure 12B:
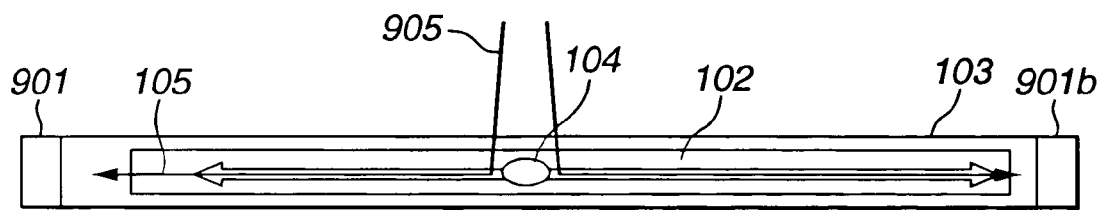

Structures of the image pickup apparatuses illustrated in FIGS. 12A to 12D correspond to those of the display apparatuses illustrated in FIGS. 8A to 8D, respectively. FIGS. 12A to 12D show z-y cross sections of the image pickup apparatuses, and these structures are arrayed in the x-direction. In FIG. 12a, a single light scattering member 104 is provided for a single light receiving device 901. In FIG. 12B, two light receiving devices 901 and 901b are arranged at either end of each guide member 103 for guiding a single light scattering member 104 such that the amount of light received by the light receiving devices can be approximately doubled.

Figure 12C:
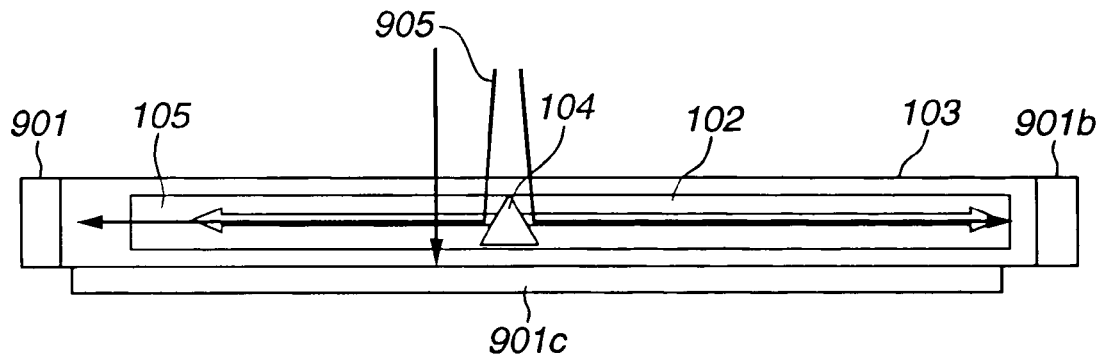
Figure 12D:
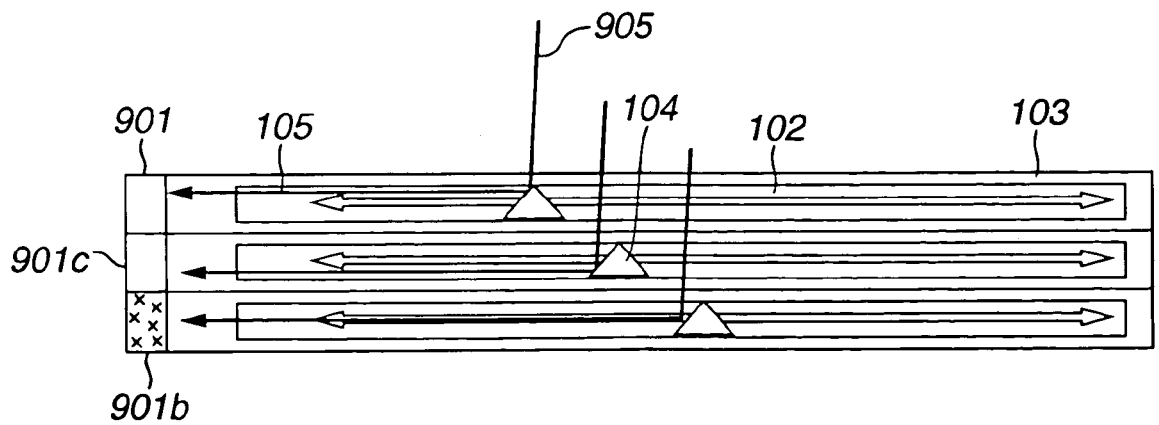

Further, when the light receiving devices 901 and 901b are ones with different color sensitivities, such as a light receiving device sensitive to red light and a light receiving device sensitive to blue light, respectively, the image pickup apparatus can separate colors of light from an object. In FIG. 12C, three light receiving devices 901, 901b and 901c of R, G and B colors are arranged at either end and on the back side of each guide member 103. As the light receiving device 901c arranged on the back side, a CCD (charge-coupled device) or CMOS (complementary metal-oxide semiconductor) sensor of a two-dimensional array type can be used, for example. In FIG. 12D, three image pickup apparatuses respectively including light receiving devices 901, 901b and 901c or R, G and B colors as illustrated in FIG. 12A are stacked in the z-direction.

In each image pickup apparatus, the light receiving device 901 can be a photodiode, a phototransistor, a photoconductive element, or the like. Where the light receiving device 901 is disposed at an end of the guide member 103, light receiving devices arrayed in the x-direction, such as a CCD or CMOS sensor, can be preferably used. In an image pickup apparatus with a relatively large area such as an apparatus with a two-dimensional array of light receiving devices, an array of light receiving devices with light receiving pixels composed of photodiodes and TFT transistors can be used.

A color filter can be disposed on the surface of the light receiving device to perform color separation. In the structures of FIGS. 12B, 12C and 12D, pickup of a color picture can be performed by applying such a light receiving device to each of the light receiving devices 901, 901b and 901c.

In the above-discussed image pickup apparatuses, intensity of light received by the light receiving device reflects the positional distribution of intensity of incident light from the object, and changes as the light scattering member 104 moves. The image information can be obtained or extracted from information of light intensity from the light receiving device 901 and information of the position of the moving light scattering member. A conventional processing circuit can be used as the extracting means.

Also in the image pickup apparatus, the structure as illustrated in FIG. 10 can be adopted. Such an image pickup apparatus includes a control unit 702 having a receiver circuit for the light receiving device and a driver circuit for the light scattering member, a light receiving unit 701 having light scattering members 104, and a light guide assembly 703 composed of plural light guides for guiding light beams from the light scattering members 104 to the control unit 702. In such a light receiving unit 701, only a small light scattering member 104 is rapidly moved along the guide member, so no electric wiring is needed in the light receiving unit 701.

Further, in such an image pickup apparatus, there is no need of arranging a charge transporting portion, matrix wiring, a transistor and the like, so its aperture efficiency can be increased. Further, a planar light receiving portion of the image pickup apparatus can be constructed of only transparent material and small light scattering members 104 for changing the optical path, so the light receiving portion can be readily made transparent. Thus, a see-through image pickup apparatus can be achieved. When the guide member 103 is formed of flexible and bendable material, a flexible image pickup apparatus with a bendable light receiving portion can be constructed.

In addition, a highly-sensitive image pickup apparatus can be attained by stacking the above-discussed plural image pickup apparatuses. A color image pickup apparatus can be attained by stacking the image pickup apparatuses of R, G and B colors as illustrated in FIG. 12D, for example.

The above-discussed image pickup apparatus can be employed as various image pickup apparatuses such as a facsimile, a camera, or a copying machine.

A seventh embodiment of a reading apparatus of the present invention will be described. FIGS. 13A and 13B, and FIGS. 14A and 14B illustrate cross sections of its variations, respectively. In these figures, there are shown a light emitting device 101, transparent medium 102, a guide member 103, a light scattering member 104, a light beam 105, a light receiving device 901, an original (an object to be read) 902, and a light source 906.

Figure 13A:
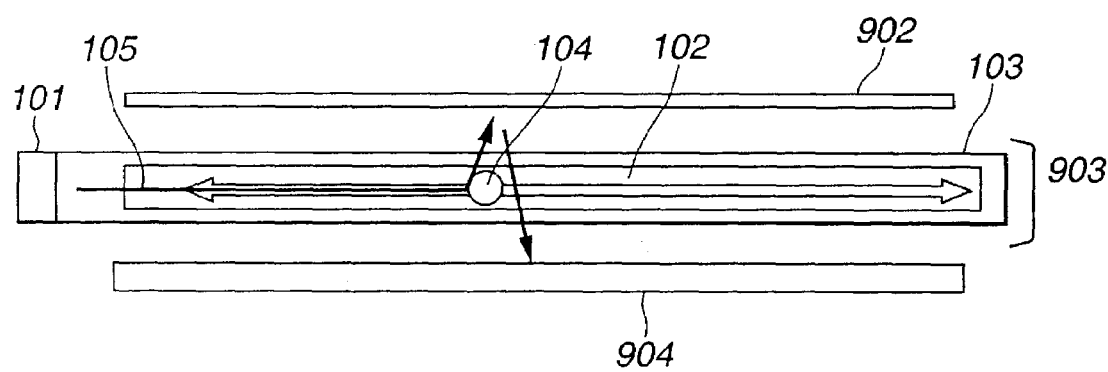
FIGS. 13A and 13B are cross-sectional views illustrating embodiments of a reading apparatus of the present invention, respectively.

The above-discussed light source apparatus, denoted here as 903, is applied to a reading apparatus illustrated in FIG. 13A. In this structure, light from the light emitting device 101 is scattered by the light scattering member 104, and the original 902 is illuminated with the scattered light. Light from the original 902 is received by an image pickup device 904 such as a CCD or CMOS sensor. An optical component such as lens can be disposed between the image pickup device 904 and the original 902 if necessary, i.e., in the case where the image must be reduced or enlarged, for example.

Figure 13B:
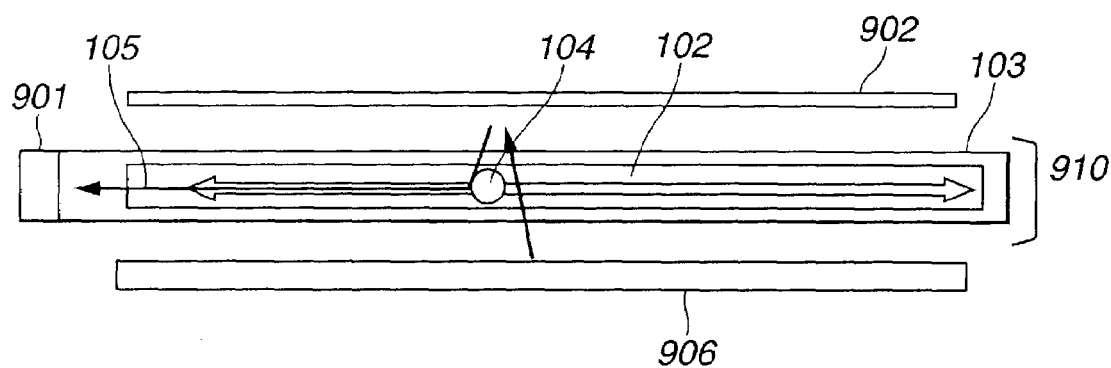

The above-discussed image pickup apparatus, denoted here as 910, is applied to a reading apparatus illustrated in FIG. 13B. In this structure, light from the light source 906 such as conventional discharge lamp or LED is applied to the original 902, and light from the original 902 is scattered by the light scattering member 104 to be received by the image pickup apparatus 910. Also in this structure, an optical component such as a lens can be provided between the image pickup apparatus 910 and the original 902.

Figure 14A:
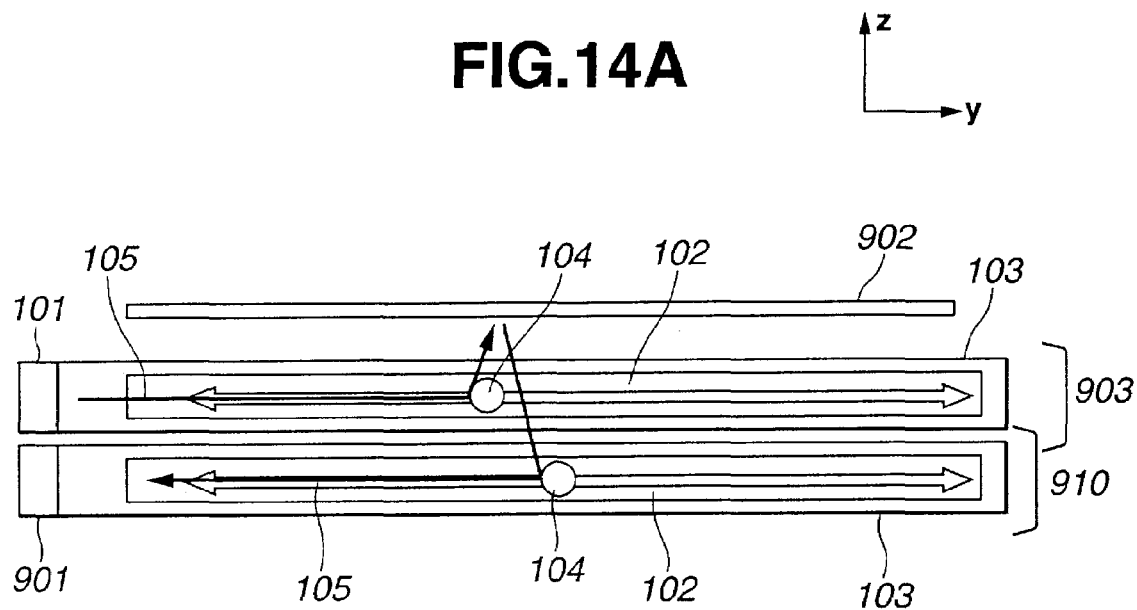
FIGS. 14A and 14B are cross-sectional views illustrating embodiments of a reading apparatus fo the present invention, respectively.

FIG. 14A illustrates a reading apparatus having both of the above-discussed light source apparatus 903 and image pickup apparatus 910. Light from the light source apparatus 903 is applied to the original 902, and light from the original 902 is received by the image pickup apparatus 910. Also in this structure, an optical component such as a lens can be provided between the image pickup apparatus 910 and the original 902.

Figure 14B:
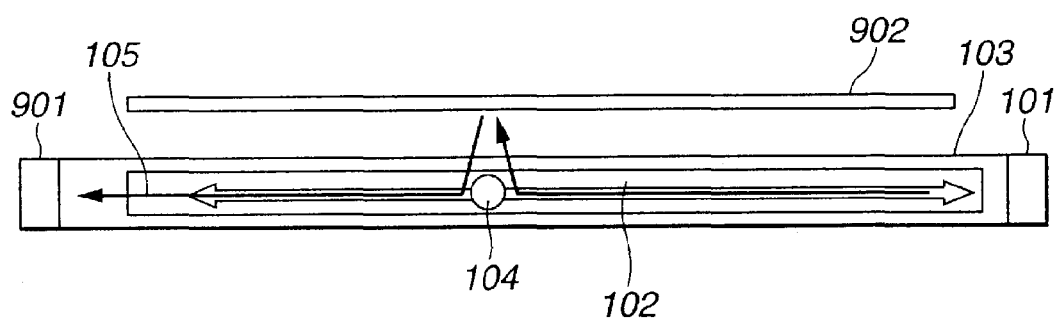

FIG. 14B illustrates a reading apparatus having both functions of light source and image pickup apparatus. Its structure is fundamentally similar to those of the above-discussed light source and image pickup apparatus with the exception that the light emitting device 101 is disposed at one end of the guide member 103 while the light receiving device 901 is disposed at the other end. Light from the light emitting device 101 is transmitted in an array form in the y-direction along the transmission path composed of transparent medium 102 and the guide member 103, and scattered by the light scattering member 104 to be applied to the original 902. Further, light from the original 902 is again scattered by the light scattering member 104, and transmitted in an array form in the y-direction along the above transmission path to be received by the light receiving devices 901 arranged corresponding to the respective light beams 105.

Also in the above-discussed reading apparatus, intensity of light received by the light receiving device 901 reflects the intensity at each location of the original 902 where the light scattering member 104 is present, and changes as the light scattering member 104 moves. The image information can be read from information of light intensity from the light receiving device 901 and information of the position of the moving light scattering member at each time. A conventional processing circuit can be used as the reading means.

The structures as illustrated in FIGS. 13A, 13B, 14A and 14B respectively make best use of the advantage that light receiving surfaces of the light source apparatus and the image pickup apparatus can be made substantially transparent. Thus, a flat-type reading apparatus can be readily constructed. The reading apparatuses are usable as a facsimile or a copying machine.

An eighth embodiment of a display apparatus having a more specific construction will be described with reference to FIG. 2. The fundamental construction of the eighth embodiment is the same as that of the first embodiment.

The display apparatus of this embodiment includes 20×20 pixels, and uses as light emitting devices 101 an array of twenty (20) red laser diodes with radiation wavelength of 0.65 microns and output of 3 mW, which are arranged with pitches of 1.5 mm. The guide member 103 is composed of a polycarbonate plate with a refractive index of 1.59, which is appropriately shaped by resin molding. The plate size of the polycarbonate plate is five (5) square centimeters, and twenty (20) square guide grooves with width of 1 mm, depth of 1 mm and length of 40 mm as illustrated in FIG. 4A are formed with pitches of 1.5 mm.

A steel ball with a diameter of 0.8 mm is used as the light scattering member 104, and it is put in the guide groove of the guide member 103. Grooves of the guide member 103 are sealed with a sheet of polycarbonate having a thickness of 0.5 mm. The transparent medium 102, i.e., vacuum, is formed in the grooves by evacuation and decompression of the grooves. The laser diode 101 is arranged on a side of the guide member 103 such that the light beam 105 from the laser diode 101 propagates in the transparent medium 102. Directivity of the laser diode 101 is excellent, so light therefrom travels in a predominantly straight manner in the transparent medium 102 over the display area.

A bar-like neodymium magnet 403 with x-direction length of 40 mm and y-direction width of 3 mm is placed on the linear motor 402 and arranged on the back side near the plate of the guide member 103 as illustrated in FIG. 5A. When the magnet 403 is periodically reciprocated at 12 Hz, twenty steel balls 401 follow the movement of the magnet 403 with little moving variation. In such a structure, when the light emitting device 101 outputting the light beam 105 propagating in the Px-th row or column is modulated by the LD driver circuit 602 in synchronization with the y-direction position Py of the light scattering member 401 moving the Px-th row or column, the amount of light scattered at the position (Px, Py) is regulated to perform display. Although the light scattering member 401 moves in the y-direction over a range of 40 mm, the display area is set in a central portion with a length of 30 mm. In displaying the picture, data of position and velocity of the light scattering member 401 driven by the linear motor is stored beforehand in the control circuit as table data, and the light emitting device 101 is driven in view of this table data. Moving pictures with frame frequencies of 24 Hz are formed according to the scan of the light scattering member 401. The picture of the above display apparatus is confirmed to be sufficiently bright and clear.

A ninth embodiment of a display apparatus having a more specific construction will be described. The fundamental construction of the ninth embodiment is also the same as that of the first embodiment.

The display apparatus of this embodiment includes 40×40 pixels, and uses a fluid flow for driving the light scattering member. The light emitting devices 101 are composed of an array of forty (40) red laser diodes with radiation wavelength of 0.65 microns and output of 3 mW, which are arranged with pitches of 1.2 mm. The guide member 103 is composed of a glass capillary. Its length is seventy (70) mm, its inner diameter is 0.9 mm, and its outer diameter is 1.1 mm.

An Al-coated glass ball with a diameter of 0.8 mm is used as the light scattering member 104, and it is put in the glass capillary 103. At both ends of the glass capillary, smaller capillaries with length of five (5) mm, inner diameter of 0.5 mm, and outer diameter of 0.7 mm are fixed, respectively. The smaller capillaries act as stoppers for the light scattering member 104 so as to keep it in a moving range of 60 mm. Forty (40) glass capillaries 103 each containing the light scattering member 104 are arranged at pitches of 1.2 mm on a glass substrate.

The laser diode 101 is arranged on a side of the glass capillary 103 such that the light beam 105 from the laser diode 101 propagates in the transparent medium (air) 102. The light scattering member 104 is reciprocated in the glass capillary 103 by controlling the air flow. The air flow is driven by the method of FIGS. 6C and 6D in which a cylinder-type pressure control portion 504 is disposed at one end of the capillary 103 to reciprocate the air flow by raising or lowering its pressure. A hole for pulling out the air 102 is formed at the other end of the capillary 103 corresponding to the fluid reservoir 505. Thus, the glass ball 104 is reciprocated in the y-direction at 15 Hz.

In such a structure, the light emitting device 101 is modulated by the LD driver circuit 602 in synchronization with the reciprocal movement of the light scattering member 401 in the range of 60 mm. A central region of 48 mm is used as the display area. The light receiving device is disposed in the non-display area as the sensor for detecting the position of the light scattering member. The light emitting device 101 for display can also be used as a light source for this position sensing. Using this position monitoring information, feedback control of the pressure control portion 504 is performed to increase accuracy of the reciprocal movement of the light scattering member 104. This information is also used for correction of the driving and modulation of the light emitting device 101. Thus, a moving picture is formed at relatively-stable frame frequencies of 30 Hz.

A tenth embodiment of a display apparatus having a more specific construction will be described. The fundamental construction of the tenth embodiment is similar to that of the ninth embodiment.

The guide member 103 is a capillary tube formed of fluorine-contained resin (its refractive index is 1.45) which is filled with transparent medium 102 of glycerin (its refractive index is 1.47). LEDs of R, G and B colors are used as the light emitting devices 101. The capsule 204 filled with the white ink 203 as illustrated in FIG. 3D is used as the light scattering member 104. The light scattering member 104 is reciprocated at 8 Hz by the method of controlling the fluid flow as in the ninth embodiment.

In this embodiment, since the transparent medium 102 of glycerin with refractive index smaller than that of the capillary 103 is used, a refractive-index waveguide structure is built such that the light beam 105 can be effectively transmitted in the medium 102. Accordingly, even when the LED with less directivity than that of the LD is used as the light emitting device, a preferable picture can be formed.

Further, since a difference in the refractive index between the guide member 103 and the transparent medium 102 is small, transparency to external light is excellent and reflection of external light is suppressed. Thus, a display apparatus with good picture visibility can be obtained. This display apparatus is a see-through display which is transparent at non-display time and whose back can be seen even during display time. Further, since the guide member 103 is formed by the flexible and bendable capillary tube, a flexible display apparatus with a bendable display portion can be constructed.

An eleventh embodiment of a display apparatus having a more specific construction will be described. The display apparatus of this embodiment includes the control unit 702, the display unit 701, and the light guide assembly 703 as illustrated in FIG. 10. The fundamental construction of the display unit 701 is similar to that of the ninth embodiment. In the eleventh embodiment, the light scattering member 104 has an oval shape with longer diameter of 0,9 mm and shorter diameter of 0.7 mm. A plastic optical fiber is used as the light guide of the light guide assembly 703, and light transmitted through the optical fiber to the capillary. The light scattering member 104 is moved by the air flow which is controlled through the fluid driving line 704 from the control unit 702.

A twelfth embodiment of a light source apparatus having a more specific construction will be described. The fundamental construction of the twelfth embodiment as illustrated in FIG. 11A is the same as that of the ninth embodiment. A white-color LED is used as the light emitting device 101. The LED 101 is continuously driven in a simple manner, and the light scattering member 104 is reciprocated at 15 Hz without any special positional control. In such a flat-type white light source apparatus, illumination light is line-scanned by the reciprocal movement of the light scattering member 104.

A thirteenth embodiment of a 21×21 image pickup apparatus having a more specific construction will be described. In the image pickup apparatus of the thirteenth embodiment as illustrated in FIG. 12B, incident light scattered by the light scattering member 104 is received by two light receiving devices 901 and 901b arranged along the x-direction. The construction of this embodiment is fundamentally the same as that of the tenth embodiment with the exception that the light emitting device is replaced by a Si-photodiode. These photodiodes have color filters of three colors (R, G and B), and are arranged at an end portion of the guide member 103. Further, an Ni-coated polystyrene ball is used as the light scattering member 104. The light scattering member 104 is driven by the method of controlling the fluid flow, and reciprocated at 1 Hz similar to the tenth embodiment. An image signal is formed based on the signal of position information of the light scattering member 104 and the signal of light intensity information from the light receiving devices 901 and 901b.

Further, since a difference in the refractive index between the guide member 103 and the transparent medium 102 is small, external light is transmitted through a place where the light scattering member 104 is reciprocated. Thus, a see-through image pickup apparatus can be achieved. Further, since the guide member 103 is formed by the flexible and bendable capillary tube, a flexible image pickup apparatus with a bendable light receiving portion can be constructed.

A fourteenth embodiment of an image pickup apparatus having a more specific construction will be described. The image pickup apparatus of this embodiment includes a reading unit (see he display unit 701) with moving light scattering members 104, and a control unit (see the control unit 702) as illustrated in FIG. 10. A single light emitting device 101 and a single light receiving device 901 are arranged for each light scattering member 104 as illustrated in FIG. 14B.

The fundamental construction of the fourteenth embodiment is fundamentally the same as that of the eleventh embodiment. In the fourteenth embodiment, the light scattering member 104 is reciprocated at ⅕ Hz, the control unit includes the light receiving device and a signal receiving portion, as well as the driver circuit for the light emitting device and the driver circuit for the light scattering member, and two light guide assemblies are connected to the reading unit. The light guide assembly 703 from one end of the reading unit is connected to the light emitting device 101, and the light guide assembly from the other end of the reading unit is connected to the light receiving device.

Each light beam 105 emitted from the laser 101 in the control unit is transmitted through the light guide assembly, thereafter transmitted in the transparent medium in the reading unit to be scattered by the light scattering member 104, and applied to an original placed near the reading unit. The light scattering member 104 is moved under control of the air flow controlled through the fluid driving line (see fluid driving line 704 in FIG. 10) connected from the control unit. Light from the original 902 is again scattered by the light scattering member 104, transmitted in the transparent medium, and transmitted through the light guide assembly connected to the other end of the transparent medium to be received by the light receiving device in the control unit.

Figure 15:
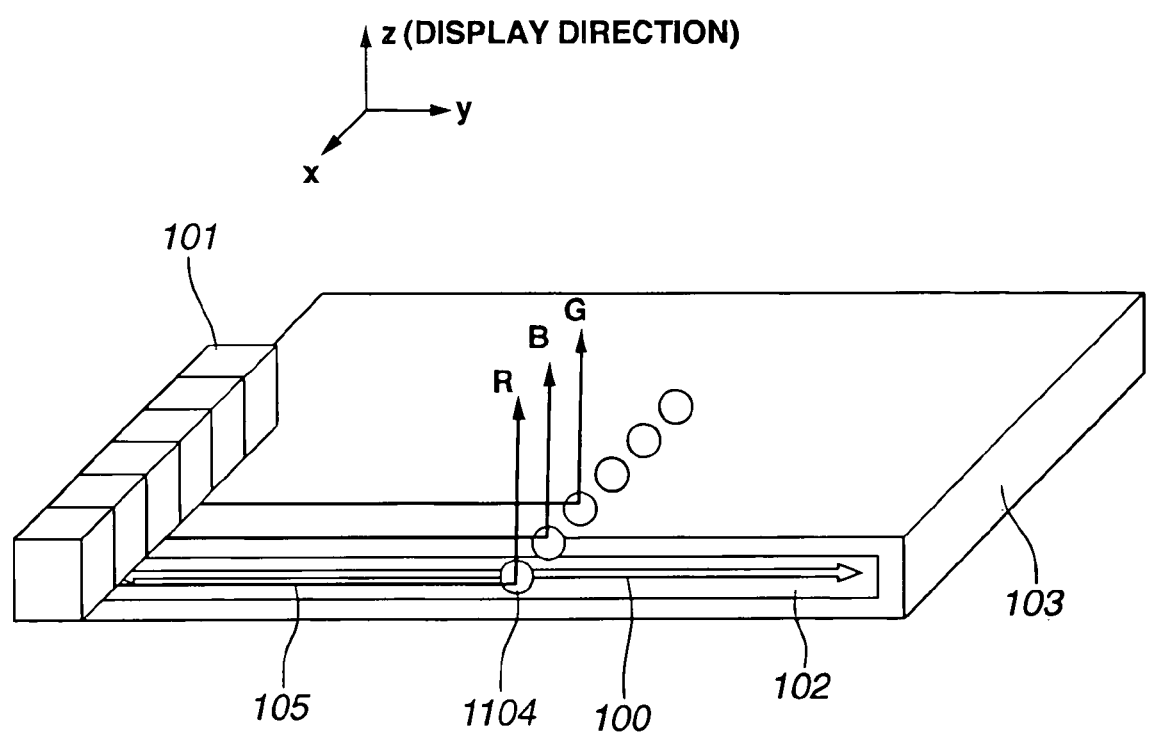
FIG. 15 is a schematic perspective view illustrating the structure of an embodiment of a display apparatus of the present invention using fluorescent members.
Figure 16:
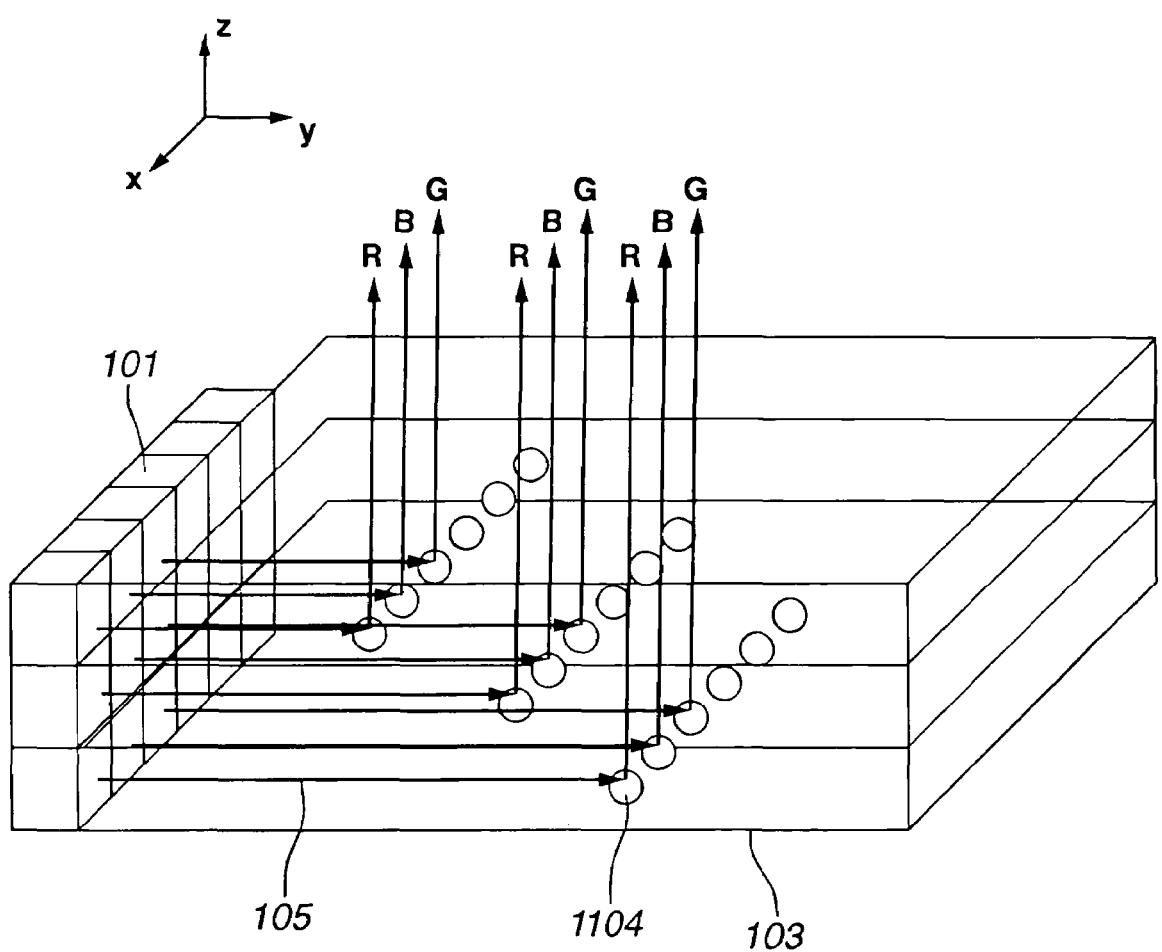
FIG. 16 is a perspective view illustrating an embodiment of a three-dimensional color display apparatus of the present invention using fluorescent members.

The light radiating apparatus of the present invention can be applied to the above embodiments of display apparatuses and light source apparatuses. FIG. 15 illustrates a fifteenth embodiment of a display apparatus using the above-discussed light radiating apparatus of the present invention. This construction is fundamentally the same as that of the first embodiment of FIG. 2 with the exception that the light scattering member 104 is replaced by a fluorescent member 1104. FIG. 16 illustrates a sixteenth embodiment of a three-dimensional color display apparatus using the above-discussed light radiating apparatus of the present invention. This construction is fundamentally the same as that of the third embodiment of FIG. 9 with the exception that the light scattering members 104 are replaced by three kinds of fluorescent members 1104 for radiating R, G and B colors and light emitting devices 101 of a single type are used.

In these apparatuses, any light emitting device capable of exciting the fluorescent member can be used depending on purposes. When a fluorescent member radiating visible light is used, light emitting devices, such as LD (InGaN-series violet laser diode and so forth), LED (InGaN-series LED and so forth), organic LED and plasma, capable of radiating ultraviolet or blue light can be preferably employed. As excitation light, it is common to use light whose wavelength is shorter than that of fluorescence light. When multiphoton absorption is used, excitation light whose wavelength is longer than fluorescence light can be used. If necessary, the color of display light can be adjusted by bonding appropriate filters on the display panel. As the fluorescent member, members containing or coated with a fluorescent substance or particles (a polyvinyl alcohol can be used as binder, for example), and capsules filled with a fluorescent substance can be used (see FIGS. 3A to 3D).

As fluorescent material, pigment, coloring matter, dye, fluorescent substance as used in cathode-ray tubes (CRT) or plasma displays (PDP), semiconductor material, or organic luminous material having fluorescent characteristics can be used, for example. Rhodamin, coumalin and the like can be used as coloring matter. Further, aluminum complex ($Alq_3$) of organic luminous material and polyparaphenylenevinyl (PPV) of high-molecular luminous material can be used.

As inorganic fluorescent material, ZnS:Mn, ZnS:Ag, ZnS: Cu (green), and Al (green) can be used. Further, red color $Zn_3(PO_4)_2$:$Mn^{2+}$, (Zn, Cd)S:Ag, $YVO_4$:$EU^{3+}$, $Y_2O_3$:$Eu^{3+}$, and $Y_2O_2S$:$Eu^{3+}$ of luminous material for CRT, green color $Y_3Al_5O_{12}$:$Tb^{3+}$ of luminous material for CRT, blue color ZnS:Ag, (La, Y)OBr:$Ce^{3+}$, and (La, Gd)OBr:$Ce^{3+}$ of luminous material for CRT can be used. ZnO:Zn, $SnO_2$:$Eu^{3+}$, and $Y_2O_3$:$Eu^{3+}$ for luminous display plates of a low voltage (10 V to 100 V) electron-beam excitation type can also be used. The ZnO:Zn can be formed by electroless plating using a solution of $ZnNO_3$ and dimethylaminebronae, for example. In addition, $BaMgAl_{14}O_{23}$:Eu, $Zn_2SiO_4$:Mn, and (Y, Gd)$BO_3$:Eu for the PDP can be used.

As a semiconductor applicable to fluorescent material, direct transition semiconductors are preferable. They are ZnO, ZnS, and CdS of II–VI compound semiconductor, AlAs and GaP of III b–V compound semiconductor, GaN and AlN of III–V compound semiconductor, MgS and MnS of chalcogenide compound, and their mixed crystal. Further, organic semiconductors such as pentacene and tetracene can be used.

While the present invention has been described with respect to what is presently considered to be the preferred embodiments, it is to be understood that the invention is not limited to the disclosed embodiments. The present invention is intended to cover various modifications and equivalent arrangements included within the spirit and the scope of the appended claims.

What is claimed is:

1. An optical-path changing apparatus comprising:
a light scattering member; and
a guide member for guiding said light scattering member, wherein a direction of light scattered by said light scattering member being substantially constant during movement of said light scattering member guided by said guide member, and wherein said light scattering member moves in said guide member.

2. The optical-path changing apparatus of claim 1, wherein said light scattering member comprises a light reflecting member.

3. The optical-path changing apparatus of claim 1, wherein a plurality of said light scattering members are provided, and said plurality of light scattering members are guided by a plurality of said guide members, respectively.

4. A display apparatus comprising:
an optical-path changing apparatus including a light scattering member, and a guide member for guiding said light scattering member, a direction of light scattered by said light scattering member being substantially constant during movement of said light scattering member guided by said guide member; and
a light emitting device for irradiating said light scattering member with light, wherein
said light scattering member moves in said guide member.

5. A light source apparatus comprising:

an optical-path changing apparatus including a light scattering member, and a guide member for guiding said light scattering member, a direction of light scattered by said light scattering member being substantially constant during movement of said light scattering member guided by said guide member;

a light emitting device for irradiating said light scattering member with light; and a display to display image information, wherein said light scattering member moves in said guide member.

6. An image pickup apparatus comprising:

an optical-path changing apparatus including a light scattering member, and a guide member for guiding said light scattering member, a direction of light scattered by said light scattering member being substantially constant during movement of said light scattering member guided by said guide member; and a light receiving device for receiving light impinging on and scattered by said light scattering member, wherein said light scattering member moves in said guide member.

7. A reading apparatus comprising:

an optical-path changing apparatus including a light scattering member, and a guide member for guiding said light scattering member, a direction of light scattered by said light scattering member being substantially constant during movement of said light scattering member guided by said guide member; and at least one of a light emitting device for irradiating said light scattering member with light, and a light receiving device for receiving light scattered by said light scattering member, wherein said light scattering member moves in said guide member.

8. A light radiating apparatus comprising:

a fluorescent member;

a guide member for guiding said fluorescent member; and a light emitting device for irradiating with light said fluorescent member moving along said guide member, wherein said fluorescent member moves in said guide member.

9. A light radiating apparatus comprising:

a fluorescent member;

a guide member for guiding said fluorescent member; and a light emitting device for irradiating said fluorescent member with light, said light emitting device irradiating said fluorescent member with light from a substantially constant direction during movement of said fluorescent member guided by said guide member, wherein said fluorescent member moves in said guide member.

10. The light radiating apparatus of claim 9, wherein a plurality of said fluorescent members are provided, and said fluorescent members are guided by a plurality of said guide members, respectively.

11. A display apparatus comprising:

a plurality of fluorescent members;

a plurality of guide members for guiding said plurality of fluorescent members, respectively; and a light emitting device for irradiating said plurality of fluorescent members with light, said light emitting device irradiating said plurality of fluorescent members with light from a substantially constant direction during movement of said plurality of fluorescent members guided by said plurality of guide members, wherein said fluorescent members move in said guide members respectively.

12. The optical path changing apparatus of claim 1, further comprising a moving assembly to move said light scattering member in said guide member.

* * * * *

UNITED STATES PATENT AND TRADEMARK OFFICE
CERTIFICATE OF CORRECTION

| | |
|---|---|
| PATENT NO. | : 7,019,447 B2 |
| APPLICATION NO. | : 10/378596 |
| DATED | : March 28, 2006 |
| INVENTOR(S) | : Tatsuya Iwasaki |

It is certified that error appears in the above-identified patent and that said Letters Patent is hereby corrected as shown below:

COLUMN 1:

Line 15, "heat" should read --head--.

COLUMN 4:

Line 12, "scatted" should read --scattered--.

COLUMN 5:

Line 27, "read" should read --red--.

COLUMN 7:

Line 30, "fo" should read --of--.

COLUMN 16:

Line 6, "FIG. 12a," should read --FIG. 12A,--.

COLUMN 20:

Line 26, "0, 9 mm" should read --0.9 mm--.

UNITED STATES PATENT AND TRADEMARK OFFICE
CERTIFICATE OF CORRECTION

PATENT NO. : 7,019,447 B2
APPLICATION NO. : 10/378596
DATED : March 28, 2006
INVENTOR(S) : Tatsuya Iwasaki It is certified that error appears in the above-identified patent and that said Letters Patent is hereby corrected as shown below:

<u>COLUMN 21</u>

Line 7, "he" should read --the--.
Line 64, "fluorescence" should read --fluorescent--.

Signed and Sealed this

Twelfth Day of December, 2006

JON W. DUDAS
*Director of the United States Patent and Trademark Office*